(12) United States Patent
Liu

(10) Patent No.: US 12,401,713 B1
(45) Date of Patent: *Aug. 26, 2025

(54) SWITCHBOARD SERVER USING A HIGH-LEVEL PROGRAMMING INTERFACE

(71) Applicant: 8x8, Inc., Campbell, CA (US)

(72) Inventor: Zhishen Liu, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 18/238,151

(22) Filed: Aug. 25, 2023

Related U.S. Application Data

(63) Continuation of application No. 17/946,611, filed on Sep. 16, 2022, now Pat. No. 11,778,017, which is a
(Continued)

(51) Int. Cl.
*G06F 15/16* (2006.01)
*G06F 9/54* (2006.01)
(Continued)

(52) U.S. Cl.
CPC .............. *H04L 67/10* (2013.01); *G06F 9/541* (2013.01); *H04L 49/25* (2013.01)

(58) Field of Classification Search
CPC ........................................................ H04L 67/10
See application file for complete search history.

(56) References Cited

U.S. PATENT DOCUMENTS 5,312,016 A   5/1994   Brennan et al.
5,390,232 A   2/1995   Freeman et al.
(Continued)

FOREIGN PATENT DOCUMENTS

WO   0135579 A1   5/2001

OTHER PUBLICATIONS

"Cisco Hosted Unified Communications Services", Cisco Product Data Sheet, Jun. 18, 2007 (retrieved May 31, 2016) http://www.cisco.com/c/en/us/products/collateral/unified-communications/product_data_sheet0900aecd80670040.html.
(Continued)

*Primary Examiner* — Yves Dalencourt
(74) *Attorney, Agent, or Firm* — Vista IP Law Group, LLP

(57) ABSTRACT

Certain aspects of the disclosure are directed to an example concerning circuitry, including a set of servers, configured according to programming instructions of a first programming language, to provide data-communications (routing) services on behalf of a plurality of switchboard interfaces that are respectively associated with a plurality of disparate client entities having respective client accounts which permit clients to receive data-communications services such as routing services. A switchboard interface (among many switchboard interfaces) is operated on behalf of one of the client entities to coordinate with the server set for effecting communications routing involving user-endpoint devices associated with the client entity. The circuitry receives client-specific directives from the client entity via a second programming language that is characterized in that it is compatible with the first programming language and maintains security of the circuitry by limiting access by the client entity to the information in the database.

20 Claims, 8 Drawing Sheets

Related U.S. Application Data continuation of application No. 16/993,591, filed on Aug. 14, 2020, now Pat. No. 11,451,620, which is a continuation of application No. 16/013,626, filed on Jun. 20, 2018, now Pat. No. 10,749,938.

(60) Provisional application No. 62/524,017, filed on Jun. 23, 2017.

(51) Int. Cl.
*H04L 49/25* (2022.01)
*H04L 67/10* (2022.01)

(56) References Cited

U.S. PATENT DOCUMENTS

| | | | |
|---|---|---|---|
| 6,304,649 B1 | 10/2001 | Lauzon et al. | |
| 6,314,402 B1 | 11/2001 | Monaco et al. | |
| 6,643,362 B2 | 11/2003 | Hogan et al. | |
| 6,772,210 B1 | 8/2004 | Edholm | |
| 6,829,348 B1 | 12/2004 | Schroeder | |
| 6,920,441 B2 | 7/2005 | Zyarko et al. | |
| 6,922,411 B1 | 7/2005 | Taylor | |
| 6,985,478 B2 | 1/2006 | Pogossiants et al. | |
| 7,274,684 B2 | 9/2007 | Young et al. | |
| 7,403,604 B2 | 7/2008 | Mundra et al. | |
| 7,702,792 B2 | 4/2010 | Shaffer et al. | |
| 7,711,094 B1 | 5/2010 | Olshansky et al. | |
| 7,933,385 B2 | 4/2011 | Dickinson et al. | |
| 8,018,921 B2 | 9/2011 | Pogossiants et al. | |
| 8,064,909 B2 | 11/2011 | Spinelli et al. | |
| 8,401,163 B1 | 3/2013 | Kirchhoff et al. | |
| 8,656,417 B2 | 2/2014 | May | |
| 8,918,867 B1 | 12/2014 | Salour | |
| 8,948,358 B1 | 2/2015 | Rengarajan et al. | |
| 8,964,726 B2 | 2/2015 | Lawson et al. | |
| 9,065,917 B1 | 6/2015 | Taliancich et al. | |
| 9,137,127 B2 | 9/2015 | Nowack et al. | |
| 9,160,696 B2 | 10/2015 | Wilsher et al. | |
| 9,240,966 B2 | 1/2016 | Wilsher et al. | |
| 9,270,833 B2 | 2/2016 | Ballai et al. | |
| 9,294,433 B1 | 3/2016 | Salour | |
| 9,294,515 B2 | 3/2016 | Sayko | |
| 9,306,982 B2 | 4/2016 | Lawson et al. | |
| 9,332,119 B1 | 5/2016 | Danis | |
| 9,338,064 B2 | 5/2016 | Stratton et al. | |
| 9,344,573 B2 | 5/2016 | Wolthuis et al. | |
| 9,407,597 B2 | 8/2016 | Lawson et al. | |
| 9,426,116 B1 | 8/2016 | Salour | |
| 9,455,949 B2 | 9/2016 | Lawson et al. | |
| 9,456,008 B2 | 9/2016 | Lawson et al. | |
| 9,459,925 B2 | 10/2016 | Lawson et al. | |
| 9,459,926 B2 | 10/2016 | Shakirzyanov et al. | |
| 9,553,475 B2 | 1/2017 | Boysen, III et al. | |
| 9,553,755 B2 | 1/2017 | Anisimov et al. | |
| 9,949,000 B1 | 4/2018 | Liu et al. | |
| 10,348,902 B1 | 7/2019 | Liu | |
| 10,530,935 B1 | 1/2020 | Britt et al. | |
| 10,705,690 B1 | 7/2020 | Mehta et al. | |
| 10,749,938 B1* | 8/2020 | Liu | G06F 9/541 |
| 11,451,620 B1* | 9/2022 | Liu | H04L 67/10 |
| 11,778,017 B1* | 10/2023 | Liu | H04L 65/1053 |
| | | | 709/219 |
| 2002/0141352 A1 | 10/2002 | Fangman et al. | |
| 2003/0128691 A1 | 7/2003 | Bergman et al. | |
| 2003/0131132 A1 | 7/2003 | Cheng et al. | |
| 2005/0084088 A1 | 4/2005 | Hamilton | |
| 2005/0095981 A1 | 5/2005 | Benco | |
| 2005/0164702 A1 | 7/2005 | Carlson et al. | |
| 2005/0283368 A1 | 12/2005 | Leung | |
| 2006/0031510 A1 | 2/2006 | Beck et al. | |
| 2006/0039354 A1 | 2/2006 | Rao et al. | |
| 2006/0209797 A1 | 9/2006 | Anisimov et al. | |
| 2006/0221941 A1 | 10/2006 | Kishinsky et al. | |
| 2006/0264208 A1 | 11/2006 | Moon et al. | |
| 2006/0274723 A1 | 12/2006 | Siyavudeen et al. | |
| 2006/0291450 A1 | 12/2006 | Ramachandran et al. | |
| 2007/0041527 A1 | 2/2007 | Tuchman et al. | |
| 2007/0047531 A1 | 3/2007 | Malhotra et al. | |
| 2007/0047571 A1 | 3/2007 | Kandikonda et al. | |
| 2007/0091800 A1 | 4/2007 | Corcoran | |
| 2007/0115942 A1 | 5/2007 | Money et al. | |
| 2007/0189481 A1 | 8/2007 | Cadiz et al. | |
| 2007/0223446 A1 | 9/2007 | McMenamy et al. | |
| 2007/0232272 A1 | 10/2007 | Gonsalves et al. | |
| 2007/0259688 A1 | 11/2007 | Forte | |
| 2008/0002820 A1 | 1/2008 | Shtiegman et al. | |
| 2008/0063153 A1 | 3/2008 | Krivorot et al. | |
| 2008/0095339 A1 | 4/2008 | Elliott et al. | |
| 2008/0096504 A1 | 4/2008 | Linkola et al. | |
| 2008/0102844 A1 | 5/2008 | Zhu et al. | |
| 2008/0125077 A1 | 5/2008 | Velazquez et al. | |
| 2008/0175230 A1 | 7/2008 | Brand et al. | |
| 2009/0003574 A1 | 1/2009 | Schneider et al. | |
| 2009/0023450 A1 | 1/2009 | George et al. | |
| 2009/0086950 A1 | 4/2009 | Vendrow et al. | |
| 2009/0129374 A1 | 5/2009 | Yurchenko et al. | |
| 2009/0129581 A1 | 5/2009 | Kambli et al. | |
| 2009/0201916 A1 | 8/2009 | Caron et al. | |
| 2009/0203375 A1 | 8/2009 | Gisby et al. | |
| 2009/0238169 A1 | 9/2009 | Dalrymple et al. | |
| 2009/0290701 A1 | 11/2009 | Portman et al. | |
| 2009/0296687 A1 | 12/2009 | Ramanathan et al. | |
| 2010/0128709 A1 | 5/2010 | Liu et al. | |
| 2010/0130228 A1 | 5/2010 | Vedrow et al. | |
| 2010/0142516 A1 | 6/2010 | Lawson et al. | |
| 2010/0232594 A1 | 9/2010 | Lawson et al. | |
| 2010/0267374 A1 | 10/2010 | Armstrong et al. | |
| 2011/0119157 A1 | 5/2011 | Sivanathan et al. | |
| 2011/0170681 A1 | 7/2011 | Kole et al. | |
| 2011/0182418 A1 | 7/2011 | Anisimov et al. | |
| 2011/0302557 A1 | 12/2011 | Tatsubori | |
| 2011/0320550 A1 | 12/2011 | Lawson et al. | |
| 2012/0069131 A1 | 3/2012 | Abelow | |
| 2012/0208495 A1 | 8/2012 | Lawson et al. | |
| 2012/0304245 A1 | 11/2012 | Lawson et al. | |
| 2013/0070757 A1 | 3/2013 | Elliott et al. | |
| 2013/0072153 A1 | 3/2013 | Lawson et al. | |
| 2013/0212603 A1 | 8/2013 | Cooke et al. | |
| 2013/0218547 A1 | 8/2013 | Ostermeyer et al. | |
| 2013/0237287 A1 | 9/2013 | Ferren et al. | |
| 2013/0238338 A1 | 9/2013 | Kharod et al. | |
| 2013/0290494 A1 | 10/2013 | Goudarzi et al. | |
| 2013/0304929 A1 | 11/2013 | Fahlgren et al. | |
| 2013/0339464 A1 | 12/2013 | Goudarzi et al. | |
| 2014/0044123 A1 | 2/2014 | Lawson et al. | |
| 2014/0105372 A1 | 4/2014 | Nowack et al. | |
| 2014/0173078 A1 | 6/2014 | McCord et al. | |
| 2014/0229289 A1 | 8/2014 | Rao et al. | |
| 2014/0270109 A1 | 9/2014 | Riahi et al. | |
| 2014/0331060 A1 | 11/2014 | Hayton | |
| 2015/0085997 A1 | 3/2015 | Biage et al. | |
| 2015/0135167 A1 | 5/2015 | Berk et al. | |
| 2015/0193234 A1 | 7/2015 | Udayakumaran et al. | |
| 2015/0331727 A1 | 11/2015 | Mameri et al. | |
| 2016/0080220 A1 | 3/2016 | Winningham | |
| 2016/0134616 A1 | 5/2016 | Koushik et al. | |
| 2016/0134757 A1 | 5/2016 | Ballai et al. | |
| 2016/0241606 A1 | 8/2016 | Calamera | |
| 2016/0277587 A1 | 9/2016 | Alexander et al. | |
| 2016/0295017 A1 | 10/2016 | Zgardovski et al. | |
| 2016/0350204 A1 | 12/2016 | Conlon et al. | |
| 2016/0352790 A1 | 12/2016 | Hollingsworth et al. | |
| 2016/0360033 A1 | 12/2016 | Kocan | |
| 2017/0070540 A1 | 3/2017 | Combellas et al. | |
| 2017/0075719 A1 | 3/2017 | Scallan et al. | |
| 2017/0142256 A1 | 5/2017 | Bjorsell et al. | |
| 2017/0187877 A1 | 6/2017 | Smith et al. | |
| 2017/0207988 A1 | 7/2017 | Li et al. | |
| 2017/0262265 A1 | 9/2017 | Kellicker et al. | |

(56) References Cited

U.S. PATENT DOCUMENTS

2018/0053401 A1    2/2018  Martin et al.
2018/0324093 A1  11/2018  Namjoshi et al.

OTHER PUBLICATIONS

USPTO Notice of Allowance dated Jun. 23, 2023, received for U.S. Appl. No. 17/878,571 of the instant Applicant/Assignee, 9 pages.

\* cited by examiner

SWITCHBOARD SERVER USING A HIGH-LEVEL PROGRAMMING INTERFACE

Aspects of various embodiments are directed to communication and computing services. Data communications platforms have allowed individuals to make and receive data communications using broadband Internet connections in place of traditional telephone lines. A data communications endpoint device can use a broadband Internet connection to connect to a data communications server that is managed by a data communications service provider. The data communications server can handle communication routing and provide other data communications services for the data communications endpoint device.

Computer servers are increasingly being used to provide various services over a network including, but not limited to, VOIP communication services such as VOIP calls, video conferencing, call exchange servers, packet switching, and traffic management as well as non-VOIP services including, but not limited to: website hosting, remote data storage, remote computing services, and virtual computing environments.

The use of data communications services has been widespread and significant in terms of both numbers of users and types of services being made available. This growth may be attributable to any of a wide variety of socio-economic changes such as the mobility of users of these services, the types and reduced costs of portable telecommunication tools, and the ever-evolving technology adapting to the personal and business needs of the communications users.

For business entities, the increased use of data communications services has been particularly complex, largely due to providing the same level of personal features to users from the vantage point of each business entity's communications platform. As examples, a data communications service provider can be providing such data communications services to a multitude of business entities each of which uses the provided services for a customized platform configured to provide communications services to a wide range of employees. For each such customized platform, it can be particularly burdensome for the data communications service provider to adjust and reconfigure the customized platform (of each respective business entity to which such services are being provided) each time a business entity (e.g., as requested by the entity's IT department, employee(s) or others) changes in terms of the employee's communications equipment/endpoint devices.

SUMMARY

Various example embodiments are directed to issues such as those addressed above and/or others which may become apparent from the following disclosure concerning systems and methods for a switchboard server using a high-level programming interface.

Embodiments are directed toward methods for use in communications systems employing a data communications server operated by a communications service provider, where the data communications server is on the data communications provider side is used to provide data communications services to a multitude of client entities. In such contexts, the data communications server may be referred to as a data communications provider server. In such systems, the data communications server includes one or more computer processor circuits (configured with access to databases stored in memory circuits) and configured to act as a communication-control engine for routing, processing communications and/or providing related communications services on behalf of client entities. Such client entities may be exemplified respectively as the above-noted businesses with employees ranging in number from just a few to thousands, and being located/mobile for communications services in any of a multitude of venues. In these embodiments, such methods use the communication-control engine to provide such communications services by receiving data communications from data communications endpoint devices, and identifying client-specific sets of control data (e.g., providing directives or commands with communication processing data), derived from programming instructions written in a first instruction-configurable/programmable language that is associated with a message exchange protocol that is used between the data communications routing server and data sources. Examples of such client-specific sets of control data may include other forms of code providing data and/or instructions over an interface facilitating communication between the communications provider and the data communications endpoint devices. Such methods execute the client-specific sets of control data to make decisions on how to route communications placed by the data communications endpoint devices, and to identify a set of instructions (written in a second instruction-configurable/programmable language) associated with the routing decisions.

The first and second programmable languages may be similar, in that both languages are derivatives of a same type of programmable language, but the first and second programmable languages may differ in terms of content and use. The first programmable language may identify communication processing directives provided to the communications provider by the client entity, whereas the second programmable language may identify communication routing directives as provided by the communications provider. Such methods execute the set of instructions to retrieve data from the data sources maintained by the communications provider, and provide, in response to the data, communication control functionality for the data communications placed by the endpoint device. The first and second programming languages are related languages, whether indirectly or directly related via at least one level of translation. For example, or analogous to, C++, compiled to assembly/object level code and a converted to higher-level, different language or set of instructions.

Certain embodiments are directed toward an apparatus for communications over one or more wide-band networks. The apparatus may comprise a communication routing circuit configured and arranged to route communications for a plurality of switchboard interfaces, each switchboard interface corresponding to a data communications-enabled device of a respective receptionist. The apparatus further comprises a computing server that is configured and arranged to provide data communications for a plurality of endpoint devices, each respectively associated with an account of a respective one of a plurality of disparate client entities. The computing server can provide such data communications by routing data communications for the endpoint of each of the plurality of disparate client entities and generating communication event data for the routed data communications. In providing such data communications, the computing server may provide to the client entities, a set of instructions written in a first programming language that is associated with a message exchange protocol between a data communications provider server and data sources. The set of instructions include aspects of the message exchange protocol to be populated with client-specific directives associated with virtual office features (e.g., the types of data communication services) available to the client entities. The client-specific sets of control data may be generated by the client entity by populating the set of instructions (received from the data communications provider server) with the client-specific directives. The apparatus further includes a processing circuit communicatively coupled to the computing server and configured and arranged to receive the communication event data from the computing server, and for each of the plurality of disparate client entities, in response to a subscription request from a switchboard interface for the client entity. The processing circuit may initiate a new subscription for the switchboard interface, and while the subscription is active, provide pseudo-event message data indicating a data metric specified in a respective set of control data for the client entity derived from programming instructions received over the message exchange protocol, wherein the programming instructions correspond to a second programming language that is compatible with the first programming language.

Certain embodiments are directed toward an apparatus for communications over one or more wide-band networks. The apparatus includes a communication routing circuit configured and arranged to route communications for a plurality of switchboard interfaces, each switchboard interface corresponding to a data communications-enabled device of a respective client entity. The apparatus may further include one or more computer processor circuits coupled to memory circuits and configured to interface with a data communications server providing a database of virtual office features available based on a subscription. The one or more computer processor circuits are configured and arranged to receive from the data communications server, a set of instructions written in a first programming language that relates to a message exchange protocol between the data communications server and data sources. In response to a subscription request from a switchboard interface for the client entity, the computer processor circuit(s) is configured and arranged to facilitate initiation of a new subscription for the switchboard interface by providing to the data communications server, a respective set of control data for the client entity derived from programming instructions received over the message exchange protocol, wherein the programming instructions correspond to a second programming language that is compatible with the first programming language.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
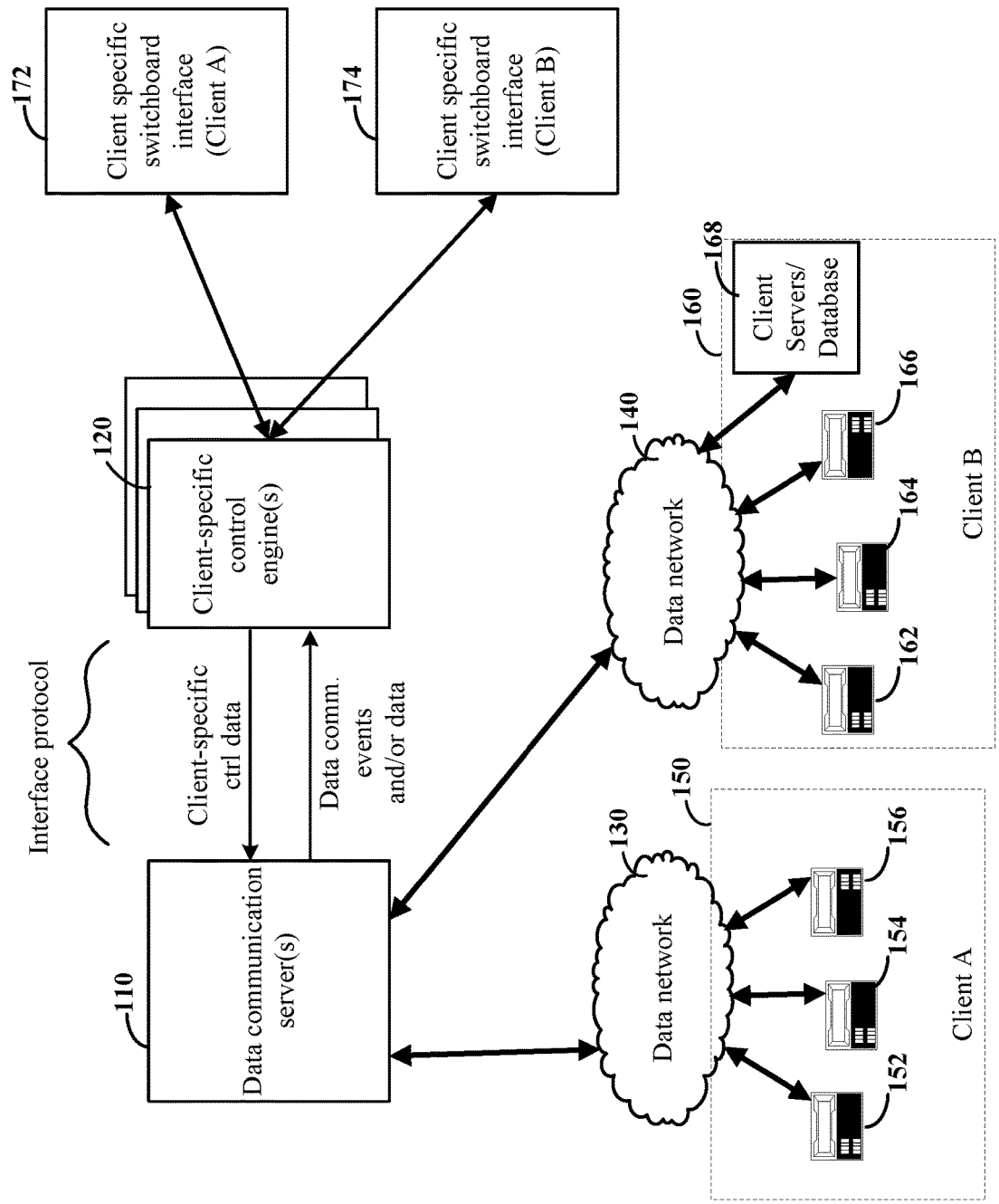
FIG. 1 is a diagram of a system including a switchboard server using a high-level programming interface, consistent with embodiments of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving a switchboard server using a high-level programming interface. In certain implementations, aspects of the present disclosure have been shown to be beneficial when used in the context of providing data communications services. While the present disclosure is not necessarily limited to such data communications systems as described herein, for purposes of facilitating understanding and appreciation of certain embodiments, the following discussion uses such data communications-based services and systems in the context and on behalf of communications platforms of client entities which subscribe to such services from a data communications service provider (with a server).

In accordance with aspects of the present disclosure, a data communications system is described to include a switchboard extension from one or more receptionists which may answer and direct incoming communications. In some embodiments, receptionists may be communicatively connected to a data communications provider server from a remote location via a web-based switchboard interface. For instance, a receptionist may load the web-based switchboard interface in a web-browser by directing the web-browser to a switchboard server coupled to the data communications provider server. In various implementations, the switchboard interface displays a status of pending communications routed to the receptionist of the data communications provider and provides various options for directing the communication including, for example, answering, hanging-up, redirecting, placing on hold, and/or parking communications.

In the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the different diagrams can refer to the same elements, more specific embodiments, or additional instances of the same element. Also, although aspects and features may in some cases be described in individual figures, it will be appreciated that features from one figure or embodiment can be combined with features of another figure or embodiment even when the combination is not explicitly shown or explicitly described as a combination. For ease of explanation, some examples may be primarily described with reference to data communication servers configured to provide data communication services for endpoints of a plurality of different client accounts. It is understood that the various examples may be adapted for use with computer servers configured to provide various other remote services, including, but not limited to: website hosting, remote data storage, remote computing services, virtual computing environments, enterprise communications, virtual contact center, and other services.

Some remote service providers customize their services for different customers. This might include customizable auto attendants, communication routing, communication forwarding, voicemail, or other features. For particularly large clients with many different telephone accounts and numbers, implementing and updating these types of customizations can be a significant undertaking. Certain embodiments of the present disclosure are directed toward an interface that allows a client-specific control engine to access and dynamically adjust the manner in which remote services are provided for the users of a client account during operation, while maintaining the integrity and security of the underlying system for providing the remote services.

According to certain embodiments, a data communication system may be configured to allow a client-specific control engine to dynamically modify and control the communication flow and processing at different levels within the system, including (re) routing of incoming communications generally and by way of private branch exchanges (PBXs) and Internet Protocol PBXs (or IP PBXs) to provide intelligent routing relative to receptionists and direct dial numbers for individuals using the IP PBXs. Within these constraints, a customer can write code that self-describes the building blocks or particular configurations used in the customer's particular application, which can be interpreted and executed by the data communications provider. In various embodiments, the building blocks or particular configurations and the data communications servers that execute the building blocks or particular configurations can be configured to interface with other sources of data and control. This can include, for example, flow control decisions that are based upon code running on the client side or on the provider side. As non-limiting examples, a client-side computer system could run code that is written using JavaScript or TCL while a server-side computer system might run code that is written using PHP: Hypertext Preprocessor (PHP), NodeJS, Python, Scala, Ruby, .Net, or other web languages.

Rules of various complexity can be used for routing incoming communications, whether to one or more receptionists, directly to extensions, to voicemail, or for other communication routing purposes. The logic used for the routing decisions can be based upon directives and related data shared across multiple PBXs, data that can be dynamically changed, and upon rules and logic that can be defined according to multiple tiers of communication routing decisions. For example, a large company may have many different offices or store locations. Portions of the communication routing and processing can be shared across the entire company. Other portions could be shared with subsets or groups (e.g., groups based upon geographic regions or countries or based upon different company divisions). Still further portions can be set based upon individuals being called. Such aspects can facilitate the configuration, management, and updating the data communications system, particularly in situations where there are many thousands of extension rules can be a difficult proposition.

According to certain embodiments, the data communications system provides inbound and outbound communication routing for one or more PBXs. A PBX is a telephone system that switches calls between enterprise users on local lines while allowing all users to share a certain number of external phone lines. External phone lines are telephone lines that are supported by telephone carriers as being individually addressable within a public switched telephone network (PSTN). For example, a PBX can use extensions to direct calls to many phones after a caller first makes a call to a shared number. As another example, a PBX can provide Direct Inward Dialing (DID). DID is a service where a telephone carrier provides a block of telephone numbers that are each routed to a PBX system rather than to individual telephone lines. Using DID, individual phone numbers can be provided to each person or workstation without separate physical lines into the PBX for each possible connection.

According to certain example embodiments, a data communications system is configured as a Platform as a Service (PaaS) that provides a user with access to, among other things, telephone communication routing control, PBX functions, computer telephony integration (CTI), and data analytics (in this context the user can refer to, e.g., person, group, server or CPU, or subscribing business entity). Embodiments of the present disclosure are directed toward an interface that allows users of the data communications system solution to access data communications capabilities of the underlying system, including its hardware and software components, while maintaining the integrity and security of the underlying system. Particular embodiments are directed toward a communications solution that allows for customization of various virtual office features for end-users of the data communications system. The virtual office features may be adjusted for such end users, while also providing the ability to interface with data sources that are either part of the underlying system or external to the communications solution. These features can be used in combination with a communication routing system that can be configured and adjusted in a scalable manner.

For instance, the switchboard server system described herein, configured in combination with the high-level programming interface described herein, may allow the system to respond to communication state notification events received from the data communications provider server, and to perform communication-related actions responsive to such communication state notification events. These events can be generated in response to subscriptions initiated by the switchboard server in response to access requests originating from the web-based switchboard interfaces. In some embodiments, the subscription requests can be implemented using a protocol that requests current state and state updates from a remote node, such as Computer Telephony Integration (CTI) and Session-Initiation-Protocol (SIP) subscribe requests. In certain instances, the web-based switchboard interfaces can be configured to display information relating to past events including, but not limited to, communication transfer history, length of communication status, prior communication status information (e.g., time on hold), communication parking information, and combinations thereof. The subscription requests can be configured to identify nodes for which the switchboard server is providing the status to one or more active web-based switchboard interfaces.

Consistent with embodiments of the present disclosure, the subscriptions can expire after a period of time and may be terminated upon the loss of an active connection from a corresponding web-based switchboard interface. Moreover, the historical tracking of at least some status-based data can be maintained at the user computer (circuit) device that is providing the web-based switchboard interfaces. Aspects of the present disclosure recognize that it can be desirable to provide information relating to the historical status-based data for a new connection. For example, a user of the web-based switchboard interface may navigate away from the web-based interface (e.g., by hitting the back or refresh buttons of the web-browser), close a window, or may not have had a recently-active connection (e.g., accessing the switchboard interface for the first time in the morning). The past statuses may be lost (e.g., in the case of navigating away), or simply not present (e.g., in the case of no recently-active connection).

When the web-based switchboard interface is reloaded, it is difficult to determine the status of pending communications for the switchboard interface. For instance, a status update transmitted by the data communications provider server for a pending communication may have been missed while the switchboard interface for the user was not in operation. In one or more embodiments, each switchboard interface is configured to connect to the data communications provider server by establishing a communication control subscription. For the duration of a communication control subscription initiated by a switchboard interface, the data communications provider server provides event messages indicating changes in status of pending communications for the switchboard interface. The switchboard interface provides communication control commands to the data communications provider server via the communication control subscription to direct the data communications provider server to perform various communication-related actions selected by a receptionist. The communication-related actions may include, for example, answering, hanging-up, redirecting, placing on hold, and/or parking a pending communication.

In response to receiving a communication control command from a connected switchboard interface, the data communications provider server performs the requested communication related action, and communicates an event message back to the switchboard interface. The event message serves to acknowledge receipt of the communication control command and to prompt the switchboard interface to update the status of the communication. When a new communication control subscription is initiated by a switchboard interface, the data communications provider server determines whether or not there are pending communications for the receptionist. In some instances, the new subscription could correspond to a previous communication-control subscription that was disconnected. For ease of explanation, pending communications of the receptionist may be referred to as pending communications of the switchboard interface for the receptionist. If pending communications are identified, the data communications provider server communicates pseudo-event messages, which indicate statuses of the pending communications, to the switchboard interface for the receptionist. Similar to the event messages, the pseudo-event messages prompt the switchboard interface for the receptionist to display the pending communications with statuses indicated by the pseudo-event messages.

Consistent with embodiments, the pseudo-event messages can be regenerated events corresponding to historical events. For example, a communication transfer event can be recreated for a pending communication that was transferred before the new subscription was established. The switchboard server can receive the regenerated event from the data communications provider server and then provide status information to the switchboard interface. This can be particularly useful for presenting historical communication status information in connection with a new subscription for a switchboard interface.

Consistent with various embodiments, the pseudo-event messages can be dynamically generated in response to nodes identified in a subscription request. For example, the data communications provider server can identify node(s) corresponding to a subscription request. The data communications provider server can then check the communication status for the identified nodes in order to determine whether to generate pseudo-event messages that can be used to recreate historical status information. This can be particularly useful for providing historical status information without separately storing the historical events, as the pseudo-event messages can be dynamically generated in response to a subscription request.

In some embodiments, a presence (or activity) detection circuit is communicatively coupled to the data communications provider server. The presence detection circuit receives activity data indicating activity of end-users relative to a software platform (or a "computing platform") that provides various virtual office features available over a networked environment (e.g., a virtual office environment). Examples of activity data can include input/requests in network applications (such as a virtual office environment) that is indicative that a user is active on the network. Some examples of activities can include a user checking/sending email by an end-user, use of scheduling application by an end-user, use of a video conferencing application by an end-user, retrieving files from a file server by the end-user, and an active virtual desktop session of the end-user.

In particular embodiments, the software platform can be configured to allow users to access features through using a high-level programming interface. For instance, the data communications provider server may provide instructions to each of the disparate client entities (as described herein), and each client entity may in turn provide programming instructions (corresponding to the second programming language) that configure a client specific switchboard interface. In some implementations, the switchboard interface is configured to display statues of end-users included in a directory of the data communications provider server. In some implementations, the switchboard interface may also display other user information including, for example, names, department, location, local time, and/or an extension number.

The switchboard interface may also provide multiple communication channels for directing communications in the network. The communication channels may be configured to communicate various types of messages including for example, voice communications, voicemail, short-message-service (SMS) messaging, instant messaging, memos, and/or email. Communications may be directed to individual end-users or to a group of end-users.

The ability to access the underlying data communications services, including communication routing and communication control engines, can provide a platform that is both flexible and simple to implement from the viewpoints of both the data communications provider and the customers of the data communications provider. The communications solution can be configured to modify the virtual office features available to different end-users, and to control the communication flow and processing at all levels within the system, including (re) routing of incoming communications to different PBXs. When compared to an add-on type service where a communication is first handled by a separate PBX, the communications solution may offer a number of advantages and additional features including, but not limited to, increased communication routing capabilities, scalability, and reduced complexity. For instance, access to PBX functions allows for simple communication redirection to extensions or DID numbers provided by the PBX. Moreover, the communications solution coordinates and routes communications between multiple PBXs using an initial communication routing switch. Communications initially routed to a particular PBX can still be rerouted to a different PBX using the initial communication routing switch. Yet further, the communications solution allows a data communications client having multiple end-users to customize the various virtual office features provided to the end-users, without compromising the security of the underlying system or requiring additional customization by the data communications provider.

The data communications servers providing the underlying function for the data communications system can be configured to utilize a programmable (or configurable) communication protocol such as a high-level, domain-specific programming language as might be implemented with respective data communications servers providing data communications routing and IP PBX functions on respective sides of an interface configured to facilitate the communications via the defined protocol. A particular example of a data communications server may use session initiation protocol (SIP) to handle various communication functions (e.g., call setup and tear down). However, the various embodiments discussed herein are not necessarily limited thereto. Consistent with the above and in other embodiments disclosed herein, the data communications servers can be configured to establish a portion of the communication from the data communications endpoint devices to another data communications endpoint device or to endpoints on the PSTN through use of a PSTN gateway. Each of the endpoint devices includes data communications-enabled circuitry, and may include for example, IP phones, smart phones, tablets, desktop computers, plain old telephone service (POTS) telephones, and cellular-capable devices among other example devices with circuitry configured and arranged to facilitate sending and receipt of data communications.

According to more specific example embodiments, a high-level domain-specific programmable communication protocol (e.g., specific to customer-entity domains) uses one or more languages which are defined using a markup language as the basis for the language structure. Particular implementations relate to the use of at least two domain-specific languages, one that can be used for initial communication routing and the other for providing more complex and specific communication processing functions. More particular example embodiments use an extensible Markup Language (XML). An XML model defines the constraints on the high-level language, including defining the set of valid commands that can be carried out by the data communications servers. Within these constraints, a customer can write XML code that self-describes the building blocks or particular configurations used in the customer's particular application. For instance, a common set of instructions, written in the high-level language (e.g., an XML language) may be provided by a data communications provider to client entities. The common set of instructions may form a template to be populated with client-specific directives, the populated template forming programming instructions that instruct the data communications provider how a particular client entity is to be configured for various data communications services. The data communications provider may derive client-specific sets of control data from the programming instructions, and store the client-specific sets of control data for subsequent retrieval and implementation. In such a manner, the data communications provider may provide a lightweight and simplified set of instructions to client entities, and client entities may provide the data communications provider with instructions to customize the virtual office services for that particular client entity. XML also allows for various different data structures to be embedded into the XML document or file. For example, a script written in JavaScript can be embedded as character data that the data communications servers are configured to identify and execute. Unless otherwise stated, the use of XML in connection with various embodiments does not necessarily limit the corresponding embodiments, such as limiting the embodiments to the use of only an XML-based language(s). As used herein, such domain-specific programming language(s) are referred to as high-level markup languages (e.g., XML derivative languages or XML-type languages).

Various examples of such XML derivative languages are exemplified in the Appendix as attached to the underlying U.S. Provisional Patent document (Application No. 62/524, 017 filed Jun. 23, 2017) incorporated herein by reference. In certain example data communications applications, two XML-type languages are implemented as a communication processing XML and a communication routing XML, respectively as XML derivative languages corresponding to XML but customized for processing data communications on the side of the interface operating on behalf of customer entities and on the other side of the interface for higher level processing (including, for example, communication routing) by the data communications service provider. Such XML derivative languages can be written specific to types of functionality as needed for various customer entities, thereby allowing developers to program communication processing logic or service execution logic with both XML building blocks and JavaScript/TCL, or other scripting languages best suited to levels (e.g., in terms of quantity range) of a customer's endpoint devices and/or in terms of complexity of the data communications-based media functionality and evolving demands expected by a customer. In certain implementations, XML derivative languages allow data communications customer developers to program and integrate data communications flow (e.g., as provided by a cloud-based data communications service) with customer or third party application servers and databases. In particular, the communication flow can include a connection that is used as part of communication routing decisions and communication processing options that are related to one or more receptionists that can answer communications to a group of endpoint devices. The system allows different levels of communication control logic to be implemented in a manner that can facilitate scalability of the system of large organizations with many endpoint devices and/or end-users and with complex organizational structures that have corresponding complex communication routing requirements.

For ease of discussion, various embodiments are discussed in terms of XML, and more particularly, XML derivative languages. The skilled artisan would appreciate that each such XML-type embodiment is not necessarily limited to XML, XML derivative languages, or variants of XML. The corresponding directives, control and related communications data can be provided in documents corresponding to other languages and/or communications protocols; for example, one such programming language can be used for initial communication routing and another programming language can be used for providing more complex and specific communication processing functions.

According to particular embodiments, an XML engine can respond to a communication, or other event, by sending requests to a web server and get XML derivative documents (e.g. a set of instructions) for processing (providing a set of directives or instructions for taking action), thereby operating in a stateless manner that is similar to how an Internet browser, or similar interface uses Hypertext Markup Language (HTML). The XML engine can interpret a received XML derivative document to identify XML building blocks that are then rendered (i.e., executed). Each building block can define logic relating to one or more functions, such as for voice, communication control, and flow control logic. The XML engine may also execute other types of code, such as JavaScript, to create dynamic content (e.g., dynamically generated XML-derivative) for client-side flow control. Each XML derivative document may have uniform resource identifier (URI) links to a web server for iterative processing, or it may include query requests for retrieving data from various sources of data. A query could be formatted for consistency with the source of the data (e.g., by using JavaScript Object Notation (JSON) to retrieve data from third party application servers or from the data communications server provider's cloud database). This information can then be used to drive communication flow or communication control functionality and decisions.

As applicable to routing decisions relating to receptionists, an incoming communication can be processed according to an XML document with instructions (e.g., client-specific sets of control data) for determining whether communications route to a receptionist, directly to a called endpoint device, or are routed and processed in some other manner. As an example, the XML document could include a set of global rules for determining how to handle communications to endpoints of a customer (e.g., a large business with many individuals and corresponding endpoint devices). XML documents can also specify local rules for routing communications (e.g., to endpoint devices, voicemail, auto communication attendants), or otherwise processing the communication. The local rules might be used if global rules specify that the communication is not routed to a receptionist, or if the receptionist rejects or forwards the communication on. Each of the local and global rules can be driven, at least in part, by data retrieved from a data source, such as a client server or database. As an example, the global rules could access a customer database that includes lists of caller IDs that are handled differently. The communication routing data communications server does not need to have direct access to the lists of caller IDs (which might be confidential lists and thereby represent a security risk if shared directly with the fata communications server). Rather, the data communications server can send a query that includes a specific caller ID number of an incoming communication. In response to the query, information can be provided that indicates how to process the communication (e.g., whether to route the incoming communication to a receptionist or directly to the dialed endpoint device).

According to various embodiments, the high-level programming language allows a programmer access to the communications solution by way of a controlled and limited set of communication control functionality in the form of communication processing and routing operations. The limitations on the operations can be particularly useful for allowing programming control to be placed into the hands of different customers of the provider of the data communications servers. For example, the provider can update or make other changes to how the data communications servers are configured without requiring modification to documents written to use the high-level language, which might otherwise be required to account for the changes. Moreover, the data communications servers and their data can be protected from poor programming decisions (intentional or otherwise) by tightly controlling the extent that the documents provide control of, or access to, the inner workings of the data communications servers. In a similar manner, in various embodiments, the data communications customer can update or make changes to the various virtual office features that are provided to end-users to provide a customizable solution for each data communications customer and their respective end-users.

In various embodiments, the high-level programming language and the data communications servers that execute the high-level programming language can be configured to interface with other sources of data and control. This can include, for example, flow control decisions that are based upon code running on the client side or on the server side. As non-limiting examples, a client-side computer system could run code that is written using JavaScript or TCL while a server-side computer system might run code that is written using PHP: Hypertext Preprocessor (PHP), NodeJS, Python, Scala, Ruby, .Net, or other web languages.

In example embodiments, a data communications provider server may be configured to provide customized virtual office features (e.g., data communications services) to clients of the data communications provider. The data communications provider server may include one or more computer processor circuits coupled to memory circuits and configured to interface with a plurality of remotely-situated client entities. The data communications provider server can be configured and arranged to provide a database with a set of virtual office features including client-specific communication routing functions. The set of virtual office features, including communication routing functions, may be available to remotely-situated client entities based on a subscription provided by the data communications provider. The data communications server can provide to the client entities, a set of instructions written in a first programming language that is associated with a message exchange protocol between the data communications provider server and data sources.

The set of instructions can include aspects and/or portions that are to be populated (e.g., supplemented) with client-specific directives associated with virtual office features available to client entities. For example, the data communications provider server can provide to each client entity, a common set of instructions defining various aspects of virtual office features provided to the client entities. This set of instructions may serve as a sort of template, or default configuration, of virtual office features provided to the client entities. In turn, the client entities may provide to the data communications provider server, programming instructions from which client-specific sets of control data are derived, which allow the data communications provider server to customize the virtual office features provided to each particular client entity. The programming instructions can be written in a second programming language that is compatible with the first programming language (e.g., the language in which the set of instructions from the data communications provider are written in). Moreover, the programming instructions can be generated by the client entity (by a client-specific control engine) by populating or combining the set of instructions received from the data communications provider server with a set of directives associated with the virtual office features available to the client entity. The client-specific sets of control data, derived from the programming instructions and stored for subsequent retrieval and implementation by the data communications provider, can be used to provide an adjusted set of features to end-users of the client entities (e.g., based on and according to the client-specific sets of control data).

The adjusted set of virtual office features may be a subset of the virtual office features to which the client entity has subscribed. For example, a client entity such as a fitness company may subscribe to a particular set of communications services hosted by the data communications server. The client entity may have a number of franchises located in different geographic regions, and each franchise location may have different needs for communications services. As such, the client entity may wish to provide different types and/or different configurations of data communications services for its different franchise locations. In such a manner, the data communications server may provide an adjusted set of features to end-users of the client entities according to client-specific sets of control data. In another non-limiting example, the client entity may utilize a number of PBXs or IPBXs, and may segment the various end-users among the different PBXs, such that incoming communications are routed to one of the many PBXs associated with the client entity.

The client-specific sets of control data, associated with each respective client entity, may define aspects of the set of adjusted virtual office features provided to that particular client entity. As described herein, the programming instructions received by the data communications provider server from the client server may be written in a programming language that is associated with a message exchange protocol between the data communications provider server and data sources. For instance, the programming instructions, written in the programming language, may specify how data communications are routed/directed using a switchboard interface. In such a manner, client entities may create a customized switchboard for directing and/or routing data communications, in which the switchboard is programmed to communicate with the data communications provider server via an independent programming language (independent of the language used by the data communications provider).

The programming instructions provided by the client entity may define various aspects of the virtual office features provided to end-users of the client entity. For instance, the programming instructions may define handling procedures of phone communications and/or conference communications for end-users of the client entity. The programming instructions may define a manner in which phone communications to and/or from the end-users are routed upon receipt. Similarly, the programming instructions may define a communication queue process for communications placed to the end-users, and/or designate an automated communication attendant to route data communications placed to the end-users. For example, a data communications client may instruct a data communications provider to configure the client to queue incoming communications, to assign incoming communications to one or a plurality of communication queues purchased according to a subscription, and to limit a number of communications to be placed in each of the communication queues. The data communications client may also instruct the data communications provider server to configure the client entity to create subgroups of end-users, such that incoming communications may be routed to a particular subgroup of end-users.

The programming instructions may also define system integration processes. Each client entity may utilize a number of network applications to support daily operations. For instance, the client entity may utilize an email application, an appointment scheduling application, and/or a messaging application, among other examples. The adjusted virtual office features provided to the end-users by the data communications server may be configured to define a manner in which the adjusted virtual office features operate in collaboration with the different network applications of the client entity. For example, the virtual office features provided by the data communications server may collaborate with the client's email application, allowing end users to communication contacts from their email application using the virtual office features. Similarly, the virtual office features may be customized for the client entity such that the adjusted virtual office features are directed and/or routed via the switchboard interface, and using a high-level programming language that is compatible with the high-level programming language used by the data communications provider.

In various embodiments, a data communications client server may be provided, comprising one or more computer processor circuits coupled to memory circuits and configured to interface with the data communications provider server and a switchboard server. As described herein, the data communications provider server can be configured to provide a database of virtual office features available based on a subscription. Similarly, the data communications client server can receive from the data communications provider server, a set of instructions written in a first programming language that defines a message exchange protocol between the data communications provider server and data sources. The data communications client server can further generate client-specific sets of control data written in a second programming language that is a subset of the first programming language. The second programming language may be considered a subset of the first programming language, and is associated with virtual office features available to the client entity. For instance, the client-specific sets of control data, provided in the second programming language, may specify how data communications are directed by the switchboard interface, and therefore, by the data communications provider.

The data communications client server can transmit to the data communications provider server, programming instructions written in the programming language such that the client-specific switchboard interface may be configured. The data communications client server can access the set of adjusted virtual office features provided by the data communications provider server. In some instances, the client entity can allow the data communications provider to indirectly access data sources of the client entity. For example, the client entity can specify a Uniform Resource Identifier (URI) that points to the data communications client server and specifies an associated query. The data communications client server can execute, for example, a local script that may rely upon customer data. The script can generate a response in the particular programming language, and the data communications provider server can then carry out communication routing as specified by the switchboard interface, or other communication control functions, based upon the response and without ever having direct access to the customer data. As such, the data communications client server can be configured to provide programming instructions from which client-specific control data are derived, where the client-specific control data instructs the data communications provider server to retrieve data from the data sources based on the accessed set of adjusted virtual office features. The data communications client server may provide, in response to the retrieved data, communication control functionality to end-users of the client entity based on the accessed set of adjusted virtual office features.

Consistent with various embodiments of the present disclosure, programming instructions provided by the data communications client server to the data communications provider server may define various aspects of the virtual office features provided to client entities and/or end-users of client entities. For instance, a client entity may wish to provide different virtual office features to different subgroups of end-users, and/or to configure different virtual office features differently for different subgroups of end-users.

Programming instructions may be generated by a client server responsive and according to client-specific directives. Consistent with the above-characterized embodiments, at the client side of the data communications services, the client's computer-based processing resource (e.g., by the client-specific control engine) generates and submits programming instructions for assessment and use by the data communications service provider. Client-specific control data may be derived from the programming instructions and stored for subsequent retrieval and implementation by the data communications service provider. In a typical implementation, these programming instructions can be realized using codes or one or more commands (or a script of program-created commands). As examples, such codes or command sets can be implemented using a variety of programming control approaches. These approaches include, for example, a programming language (such as C++, XML, JAVA, HTML, SQL, etc.) common to both the client-specific control engine and to the data communications service provider, which receives the client-specific sets of control data (submitted from the client side) for adjusting the data communications services being provided to the submitting client.

By using a common interface protocol (e.g., the programming language, codes or command sets) which is understood by the data communications service provider, authentication and updating for added (telephony) services is readily achieved automatically and remotely without burdening the data communications service provider with cost-intensive set up procedures. Depending on the level of services being added/changed for each client, and/or depending on the client's manual-operator and/or automated technology, the programming instructions can be generated and submitted in various (coded) ways such as described above and also, for example, by dial tone input generated remotely on behalf of each client, by smartphone app specific to the client, by voice recognition, or combinations thereof. The client-specific sets of control data for a particular client entity may be generated based on various data metrics including, for example, data communication events or data received from the data communications server, client-specific directives received in the form of user input (e.g., input via dial-tones and/or GUI), data acquired from a client (e.g., from a client database), and/or data provided by third parties (e.g., third party monitoring services).

To provide a simplified, yet customizable solution that protects the security of the underlying data communications system and client entity data, the set of adjusted virtual office features may be provided to the end-users of the particular client entity in a programming language that includes communication flow commands for communication routing logic (such as an XML language, XML-derivative language, or other language described herein).

Turning now to the figures, FIG. 1 is a diagram of a system including a switchboard server using a high-level programming interface, consistent with embodiments of the present disclosure. The system includes a computing server 110 configured to provide data communications for a plurality of endpoint devices 152, 154, 156, 162, 164, and 166 connected in one or more data networks 130 and 140. The endpoint devices may include data communications-enabled devices (e.g., IP phones, smart phones, tablets, and/or desktop computers with appropriate data communications software applications) and/or non-data communications endpoint devices (e.g., plain old telephone service (POTS) telephones and cellular-capable devices). Each endpoint device is respectively associated with an account of a respective client. Endpoint devices may be associated with a particular client account by registering the endpoint device with a particular client account serviced by the data communications server. Registered devices for each client account may be listed in a respective account settings file (not shown) stored by the data communications server 110. In this example, endpoint devices 152, 154, and 156 are associated within an account 150 for a first client A and endpoint devices 162, 164, and 166 are associated within an account 160 for a second client B.

The system includes one or more processing circuits configured to implement client-specific control engines 120, which are configured to adjust the data communications provided for each client account according to a respective set of control directives. For instance, the client-specific control engines 120 may adjust routing of a data communication for a client account by providing programming instructions (from which client-specific sets of control data are derived) to the data communications server 110. For example, the client-specific control engines 120 may generate client-specific sets of control data by processing the respective set of control directives for the account in response to data communications event data or other data prompts received from the data communication server(s) 110. For instance, the control directives for a client account may be configured to adjust routing of a particular data communication in response to communication event data indicating a new incoming communication to an endpoint of the client account.

The control directives for a client account may generate the programming instructions based on various data metrics including, for example, data communications events or data received from the data communications server, user input (e.g., input via dial-tones and/or GUI), data acquired from a client (e.g., from a client database), and/or data provided by third parties (e.g., third party monitoring services). The client-specific control engines 120 communicate the client-specific control data to the data communications server(s) using an interface protocol having an instruction format that is independent of an instruction format used to implement the client-specific control engines 120 and/or client-specific control directives. The independent instruction format of the interface protocol allows clients to write programming instructions including complex logic and various data sources, for example, using various different high-level languages without regard to the particular language used to implement or communicate with the data communications provider server. In some embodiments, the instruction set of the interface protocol may be configured to limit customer control over certain data communications settings-thereby preventing clients from disrupting operations of the computing service with faulty client-specified directive code.

Different embodiments may implement the client-specific control engines 120 in various locations. For example, client-specific control engines 120 for one or more client accounts may be implemented in a central server connected to, or incorporated with, the data communications server(s) 110. Additionally or alternatively, one or more client-specific control engine(s) 120 may be implemented by one or more processing circuits maintained by the client (e.g., server/database 168). Similarly, the control directives may be stored locally within the client-specific control engines, or stored remotely (e.g., in a centralized database, in a database maintained by the client or a combination thereof).

As previously described, client-specific control engines may be used to facilitate adjustment of a variety of virtual office features including, for example, data communications services such as VOIP calls, audio and/or video conferencing, IPBX exchange servers, packet switching, and traffic management as well as non-Data communications services including, but not limited to, website hosting, remote data storage, remote computing services, virtual computing environments. One or more of such virtual office features may be provided, for example, by a cloud computing network having one or more servers configurable to provide a data communications system for a plurality of clients.

Moreover, the client-specific control engines may be used to facilitate client-specific switchboard interfaces. For example, each of client A and client B (illustrated in FIG. 1) may have a client-specific switchboard interface, 172 and 174, respectively. The client-specific switchboard interfaces may direct data communications via the data communications servers 110, and using the high-level programming languages described herein.

Figure 2:
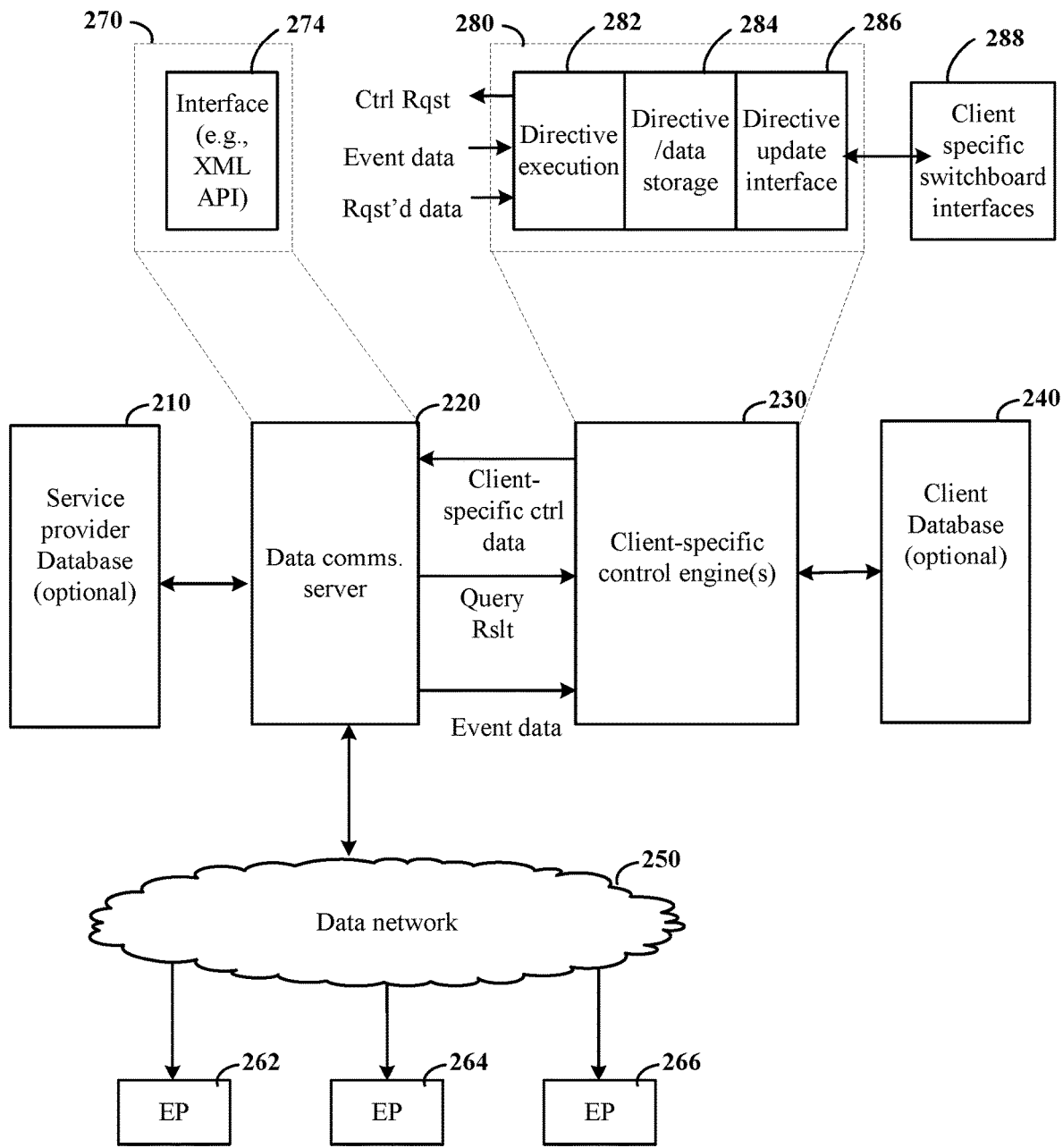
FIG. 2 is a block diagram of a communication control engine with high-level programmable language logic for two different languages, consistent with embodiments of the present disclosure.

FIG. 2 is a block diagram of a communication control engine with high-level programmable language logic for two different languages, consistent with embodiments of the present disclosure. The system includes a data communications provider server 220 configurable to provide one or more virtual office features for a plurality of endpoint devices 262, 264, and 266 connected in a data network 250. The endpoint devices may include data communications-enabled devices (e.g., IP phones, smart phones, tables, and/or desktop computers) and/or non-data communications endpoint devices (e.g., plain old telephone service (POTS) telephones and cellular-capable devices). Each endpoint device is respectively associated with an account of a respective client.

The system includes a processing circuit(s) configured to implement client-specific control engines 230. The client-specific control engines 230 are configured, as described with reference to client-specific control engines 120, to adjust the virtual office features (e.g., data communications) provided for each client account according to a respective set of control directives. For instance, the client-specific control engines 230 may dynamically adjust settings for the virtual office features provided to a client by data communications provider server 220 according to the one or more sets of control directives specified for the client entity.

As described with reference to FIG. 1, the control directives for a client account may generate client-specific sets of control data based on various data metrics including for example, data communications events or data received from the data communications server, data acquired from a client (e.g., from a client database), and/or data provided by third parties (e.g., third party monitoring services). In some embodiments, the control directives may cause the client-specific control engine 230 to query data from a client database 240 or from a service provider database 210. In some embodiments, the control directives may cause the client-specific control engine 230 to route data communications in accordance with instructions received from the client-specific switchboard interface(s) 288. Based on the instructions received by the client-specific control engine(s) 230, the data communications provider server 220 may provide to the client entity, via the data network 250, virtual office features. For instance, the data communications provider server 220 may route data communications to endpoint devices 262, 264, and/or 266 in accordance with instructions received from the client-specific switchboard interface.

The client-specific control engines 230 communicate the client-specific control data to the data communications server(s) using an interface protocol having an instruction format that is independent of an instruction format used to implement the client-specific control engines 230 and/or client-specific control directives. As previously described, the independent instruction format of the interface protocol allows clients to write programming instructions, for example, using their preferred high-level programming and/or may be used to limit customer access and/or control over the data communications provider server. For example, the interface protocol may be configured to allow the client-specific control engines to request analysis of data in the service provider database 210 without allowing direct access to the raw data stored therein. Similarly, the client-specific control engines may be configured to request analysis of data in the client database 240, without allowing direct access to the raw data stored therein.

As described with reference to FIG. 1, client-specific control engines 230 may be implemented in various locations. For example, client-specific control engines 230 for a particular client account may be implemented in the data communications provider server(s) 220, in a separate processing circuit communicatively connected to the data communications provider server(s) 220, using one or more processing circuits of the client, or a combination thereof. Moreover, the client-specific switchboard interfaces 288 may be implemented in various locations. For example, client-specific switchboard interfaces 288 for a particular client account may be implemented in a separate processing circuit communicatively connected to the data communications provider server(s) 220 (such as a separate switchboard server), in a data communications client server(s) communicatively connected to the data communications provider server(s) 220, or a combination thereof.

The data communications provider server 220 and client-specific control engines 230 may be implemented using various circuit arrangements. Block 270 shows an example implementation of a data communications provider server configured to provide a data communications IPBX service for a client. The example data communications provider server 270 includes one or more IPBX server(s) configured to establish and direct data communications for a plurality of endpoints of a customer account. Interface circuit 274 is configured to allow different client-specific control engines to communicate with the data communications provider server 220 via a common high-level language instruction set (e.g., a set of XML instructions).

Block 280 shows an example implementation of a client-specific control engine 230. In this example, the client-specific control engine includes a storage circuit 284 configured to store control directives and/or data for one or more client accounts. Directive execution circuit 282 is configured to provide client-specific control of the remote services provided for a client via execution of the control directives for the client stored in storage circuit 284. In some implementations, the directive execution circuit 282 is configured to communicate client-specific control data to the data communications provider server 220, for example, via an interface, using a high-level language instruction set (e.g., a set of extensible meta-data language (XML) instructions). Additionally or alternatively, the directive execution circuit 282 may retrieve one or more sets of directives from an external source (e.g., a client database). In this example, the client-specific control engine shown in block 280 includes a directive update interface circuit 286 configured to facilitate upload and/or editing of control directives for a client account.

Figure 3:
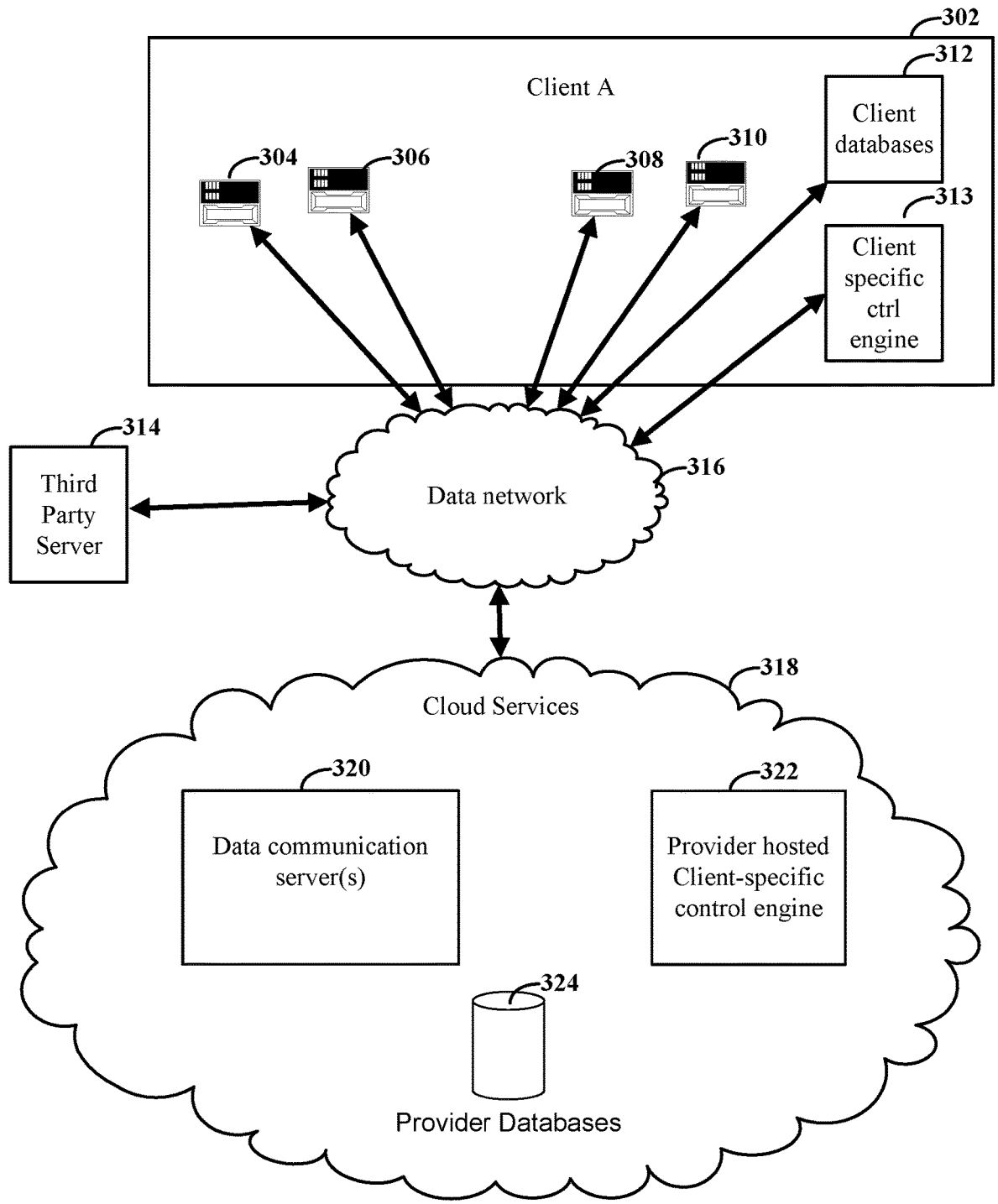
FIG. 3 is a diagram of a system that uses a high-level programming language to implement a switchboard server, consistent with embodiments of the present disclosure.

FIG. 3 is a diagram of a system that uses a high-level programming language implementing a switchboard server, consistent with embodiments of the present disclosure. In connection with these specifically-illustrated examples, data communications endpoint devices 304, 306, 308, and 310 connected in a data network 316 are configured to place and receive data communications between other data communications endpoint devices, and/or between non-fata communications endpoint devices. Non-data communications endpoint devices may include, for example, plain old telephone service (POTS) telephones and cellular-capable devices, which might also be data communications capable (e.g., smart phones with appropriate data communications software applications). The various endpoint devices include circuitry that is specially configured to provide communications functions that include interfacing with the appropriate circuitry of the communication service provider used by the corresponding endpoint device. In many contexts, a data communications endpoint device is a data communications-capable telephone commonly referred to as IP phones. The data communications endpoint devices can include, but are not limited to, desktop computers, mobile (smart) phones, laptop computers, and tablets. When each of the endpoint devices originates or receives a communication in a telephone network, each can be characterized or referred to as an addressable communication endpoint.

The communication routing and other services for the data communications can be provided by one or more data communications servers 320 within a cloud services system 318 (e.g., configured to provide virtual office features to customers of the data communications provider). In particular example embodiments, the data communications servers 320 can be located within the cloud services system 318. The cloud services system 318 also includes one or more provider hosted client-specific control engines 322, configured as described with reference to 230 in FIGS. 2 and 120 in FIG. 1. A client-specific control engine 313 may also be implemented locally by a client (e.g., 302). In some embodiments, data centers can be part of a cloud services system 318 where the hardware providing the cloud services is located in a number of different data centers with different physical locations. Consistent with embodiments, the cloud services can include SIP servers, media servers, and servers providing other services to both data communications endpoint devices and the users of the data communications endpoint devices. In some instances, the various servers, including both the data communications servers and data analytic servers discussed herein, can have their functions spread across different physical and logical components. For instance, a cloud-based solution can implement virtual servers that can share common hardware and can be migrated between different underlying hardware. Moreover, separate servers or modules can be configured to work together so that they collectively function as a single unified server.

A particular example of a data communications server uses session initiation protocol (SIP) to handle various communication functions (e.g., communication setup and tear down); however, the various embodiments discussed herein are not necessarily limited thereto. Consistent with the above and other embodiments disclosed herein, the data communications servers can be configured to establish a portion of the communication from the data communications endpoint devices to another data communications endpoint device, or to a gateway.

According to various embodiments, one or more data analytics servers can monitor and analyze communication data relating to the data communications servers and data communications endpoint devices. For example, a data analytics server can be designed to track communication statistics about various different communication-related parameters, such as communication duration, communication date, communication time of day, called parties, endpoint devices, selected data centers, selected carriers, dropped communications, transferred communications, voicemail access, conferencing features, and others. The high-level programming language(s) and the data communications servers executing the language(s) can access the communication summary metrics and the data analytics, which can be stored in a provider database 324. For example, a script running the data communications server could parse communication processing XML (CPXML) documents to generate database queries that direct the data communications server to query, or subscribe to, communication length summaries for all communications made to endpoints that are registered to the data communications server. The script could then use the information for data analytics. According to various embodiments, the database queries could be sent to a customer database 302.

Consistent with certain embodiments, the data communications server can be configured to interface with customer databases 312, or with third party servers 314. For instance, a CPXML document stored by the cloud services system 318 can identify, based upon a received communication, a Uniform Resource Identifier (URI) that points to customer databases 312, or to a third party server 314. Control directives provided from these servers, for example, in the form of a CPXML document can be used to specify communication routing, or other functions.

Figure 4:
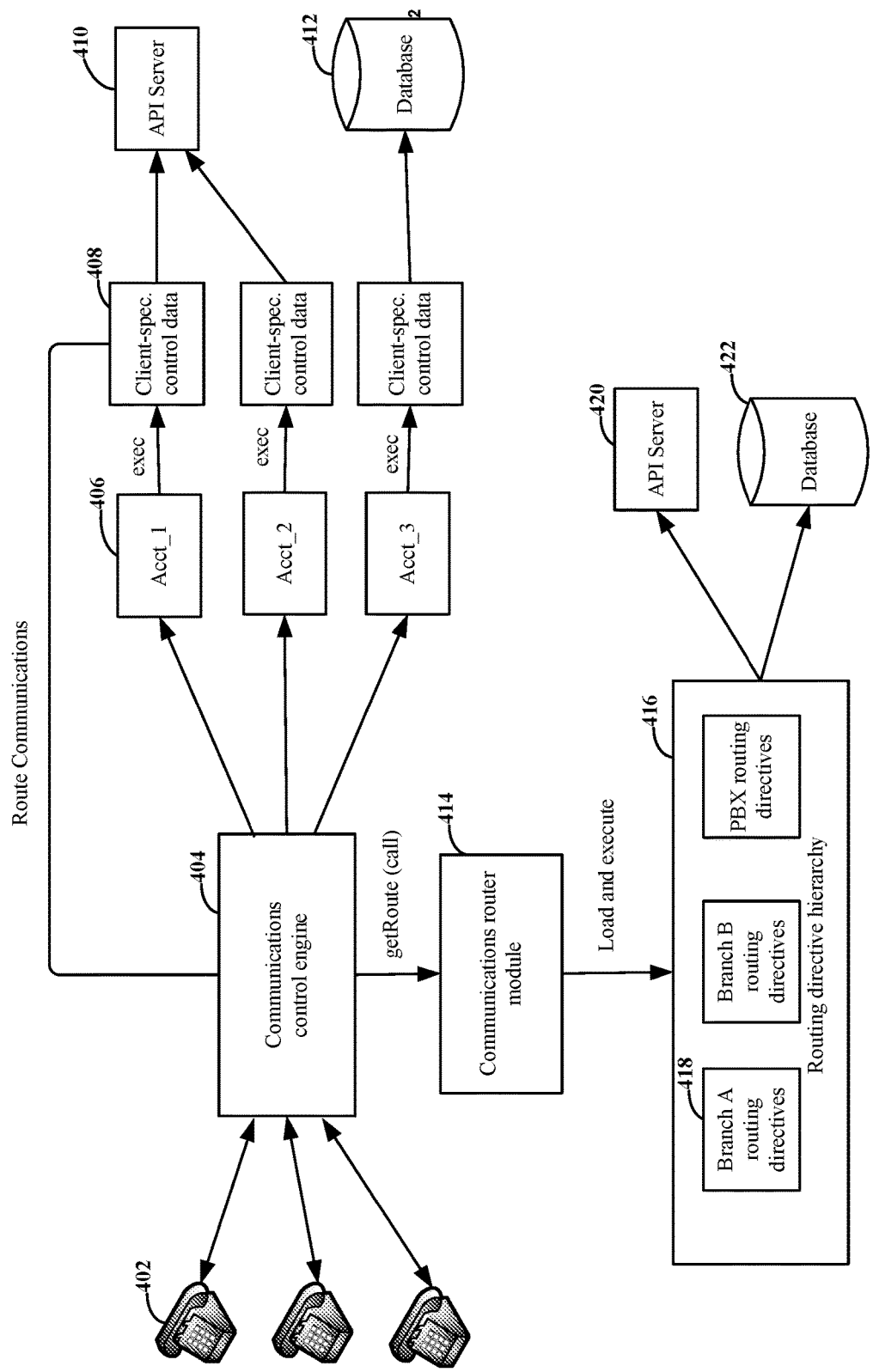
FIG. 4 is a block diagram showing the use of a hierarchy of programmable language documents, consistent with embodiments of the present disclosure.

FIG. 4 is a block diagram showing the use of a hierarchy of programmable language documents, consistent with embodiments of the present disclosure. Communication control engine 404 can provide communication flow control and routing in a manner that can be consistent with discussions found herein and relating to communication control engines, data communications servers, and the other figures. Consistent with various embodiments, the communication control engine 404 is a PBX that is part of a data communications system. For instance, the PBX can be configured using Java-based applications that manage data communications networks. The PBX can be hosted by a data communications service provider and located at one or more data centers. Various PBX features can be provided, such as communication forwarding, remote pickup, communication routing, and voice mail.

Consistent with various embodiments, customers of a data communications provider can use the data communications system by generating documents written in both CRXML and CPXML. Together, the documents specify how the customer would like communication intercept to be handled for both inbound and outbound communications. For instance, a CPXML document 408 can be associated with an extension account 406, or with groups of extension accounts. The extension accounts 406 can represent a specific individual and their associated extension number(s). A CPXML document 408 that is configured in this manner will be invoked by the communication control engine 404 after an incoming communication is routed to an extension that has CPXML capabilities enabled. The CPXML documents may specify how a switchboard web-interface retrieves communication and/or network statuses via the high-level programming interface. CPXML documents can also be used for communication flow processing of outbound communications. The CPXML document may provide logic for sophisticated communication control functions for outbound communications. For example, messages (e.g. text messages and email messages) can be automatically generated in response to outgoing communications and restrictions can be placed on outbound communications based upon factors such as time of day or communication history. Moreover, the CPXML documents can specify how incoming and/or outgoing communications are routed based on communication/ network statuses received via the high-level programming interface.

The communication control engine 404 may also consult with communication routers 414. The communication routers can be programmed using CRXML documents 418, and with JavaScript for dynamic data access and logic handling. The CRXML documents 418 can be arranged in router XML hierarchy 416, which can specify different CRXML documents 418 depending upon the branch or PBX that is identified as corresponding to the communication. Once the communication router documents are loaded, they can be cached in memory and used by the communication control engine 404 to make a routing decision. When a communication is routed through the communication control engine 404, the communication control engine can consult with high-level CRXML documents. The branch level can be identified, for example, based on the branch ID of caller (for outbound communications) or callee (for inbound communications). Delineations other than the branch are also possible, such as by the called country, the particular store, the state, or others. If a route result is not determined, the communication control engine 404 can also consult with PBX-level CRXML document to obtain routing decisions. Examples of a route result from a script are "Accept", "Reject," or "NewRoute." Thus, the programmable communication router (CRXML) module 414 provides the communication control engine 404 with the ability to handle communication intercept/filter reject or re-route the communication to a different target destination.

The communication router module 414 can also interact with a CPXML document to handle sophisticated communication flow scenarios where the communication routing is changed after the initial determination. For example, the CPXML can include commands (e.g., "reroute") that the communication control engine 404 uses to provide feedback to the programmable communication routers 414, which use CRXML for initial routing decisions. This might allow, as an example, a CRXML routing decision to be overridden by the CPXML document(s).

According to particular embodiments, the programmable communication routers (using CRXML) 414 can be viewed as plugins to the communication control engine 404. The communication router plugins may have two levels-Branch and PBX levels. The communication router supports CRXML-defined structures that specify how the PaaS can be utilized by a customer. For example, the CRXML can define sets of conditional statements, data access requests, and communication routing commands: if/else, condition, goto, log, var, script, query, data, accept, reject, route statements, or other similar commands. In particular embodiments, CRXML can be considered a subset of CPXML by containing a part, but not all, of the CPXML communication flow commands. This distinction can be useful for keeping CRXML documents light weight so that communication routing decisions are simplified and efficient. More complex tasks, such as the use of media and advanced communication handling, can be handled using CPXML. Using such programmable communication routes, a few example uses include: school district that generates SMS/Email notifications to parents whenever an emergency number is dialed; off hour restriction of outbound communication with CPXML; communication center lockdown to provide outbound dialing restriction for phones; computer initiated dialing with caller identification (ID) override based destination database table, and call return to target DID/agents; and implementation of a communication black list (denying communications to/from the list) or white list (allowing communications to/from the list) with potentially large lists and dynamic updating capabilities.

Consistent with embodiments of the present disclosure, both CRXML and CPXML provide the capability of handling dynamic data from multiple sources. Examples of these sources are depicted as application program interface servers 410, 420 and databases 412, 422. The dynamic data can therefore be provided from a variety of sources including, but not necessarily limited to, communication route session data (caller id, callee id, or route from/to), query custom object (to a database) in the data communications provider system/cloud, and access data through HTTP RESTful API. For instance, the XML documents can include a web resource that is identified by Uniform Resource Identifiers. The web resource might be a customer HTTP server that responds to a conditional query (e.g., whether or not a communication queue is above a threshold) with CPXML code that instructs the communication control engine on how to route, or otherwise handle, the communication. In such a manner, client-specific sets of control data provided by the communication control engine may allow for adjusted (e.g., customized) virtual office features for end users (such as 402) of the data communications system.

Figure 5:
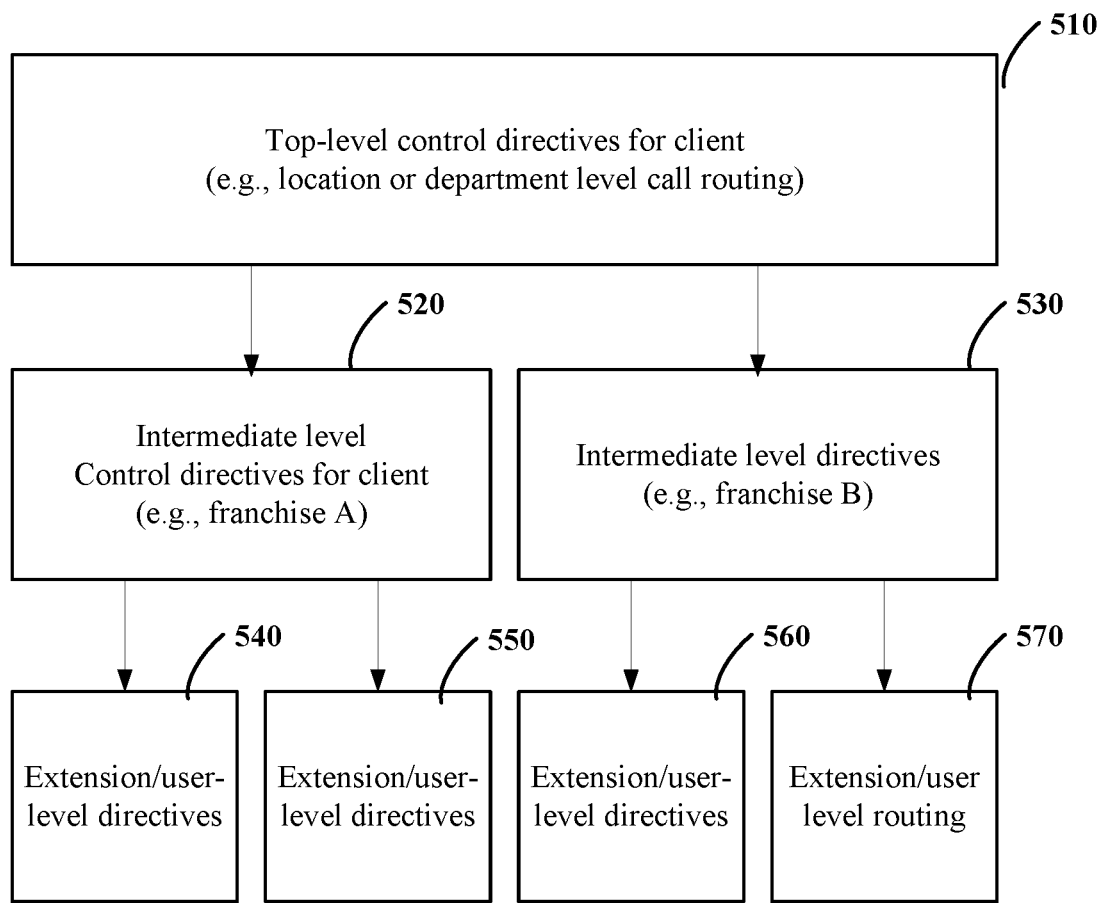
FIG. 5 is a block diagram showing an example set of control directives configured for multiple levels of control, consistent with embodiments of the present disclosure.

FIG. 5 is a block diagram showing an example set of control directives configured for multiple levels of control, consistent with embodiments of the present disclosure. The control directives described herein can be used to form programming instructions which can be transmitted to the data communications provider for adjusting the virtual office features provided to the client entity. In this example, block 510 provides a set of top-level control directives that are applicable to all data communications for a client. Blocks 520 and 530 show a set of intermediate-level control directives that are applicable only to a subset of endpoints included in the client account (e.g., for respective IPBXs, branches, department, and/or franchises). Blocks 540, 550, 560, 570 are shown as lower-level control directives that are applicable to particular extensions and/or end-users of the client account. The lower-level control directives may be useful, for example, for an end-user to customize and/or dynamically adjust direction of communications to an extension throughout the day.

Figure 6:
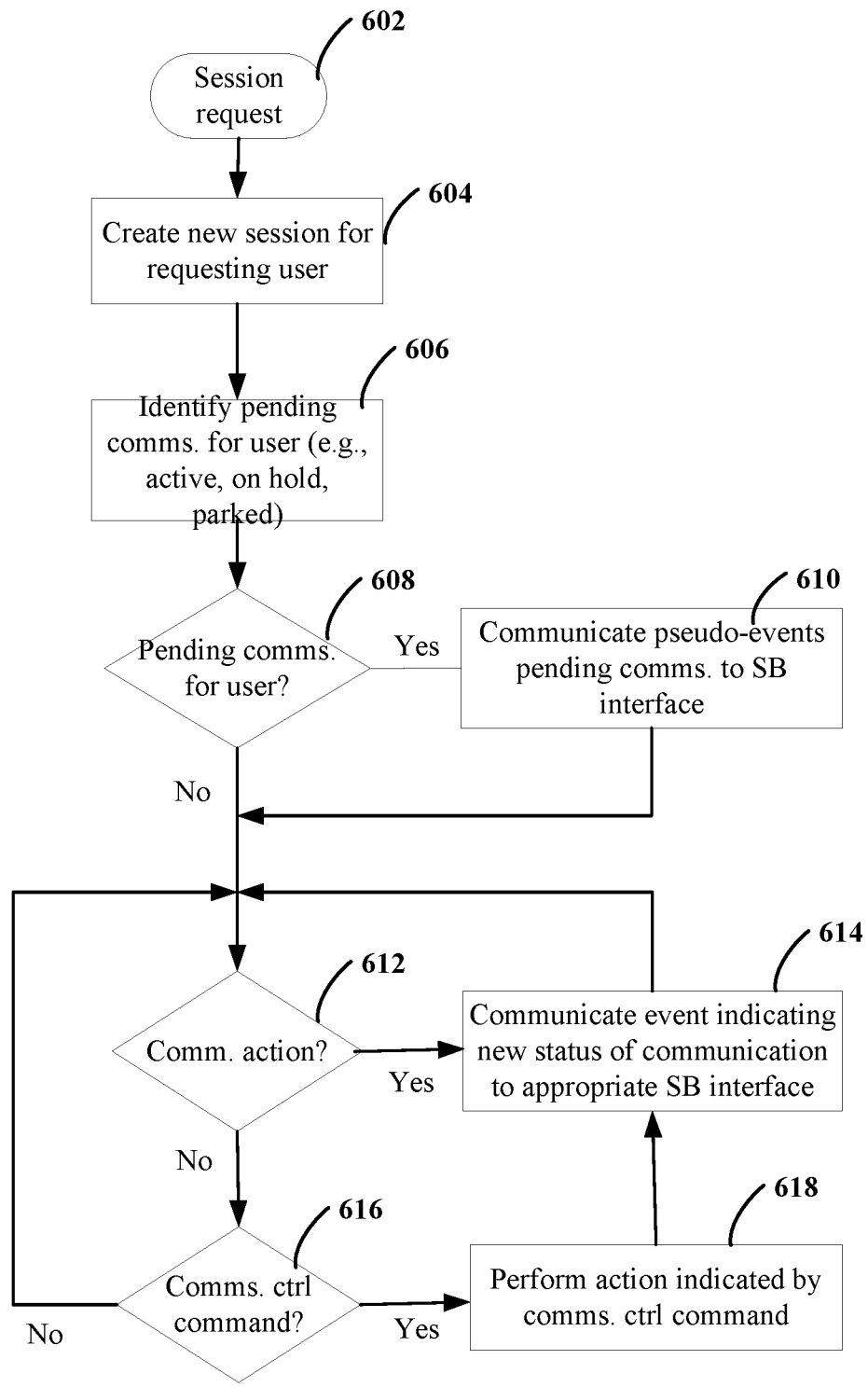
FIG. 6 shows an example method for providing status of communications in a data communications system to switchboard interfaces, consistent with one or more embodiments.

FIG. 6 shows an example method for providing status of communications in a data communications system to switchboard interfaces, consistent with one or more embodiments. In response to receiving a communication subscription request 602 for a switchboard interface, a subscription is created for the switchboard interface at block 604. At block 606, pending communications for the switchboard interface are identified. If communications are pending for the switchboard interface at decision block 608, pseudo-events are generated for the pending communications and communicated to the switchboard interface at block 610. The pseudo-events prompt the switchboard interface to restore the status of the pending communications.

After communicating the pseudo-events at block 610, or if there are no pending communications at decision block 608, the process enters a subscription loop starting at decision block 612. If status of a pending communication for the switchboard interface changes, decision block 612 directs the process to communicate a communication event indicating the new status of a pending communication to the switchboard interface at block 614. In some instances, the communication may be pending for multiple switchboard interfaces. For example, the communication may be parked in a queue shared by multiple receptionists. If a communication is pending for multiple switchboard interfaces, the communication event is communicated to each of the multiple switchboard interfaces at block 614. If a communication control command is received decision block 616, the process performs the action indicated by the communication control command at block 618. After performing the action, a communication event indicating the new status of a pending communication is communicated to the switchboard interface at block 614.

Figure 7:
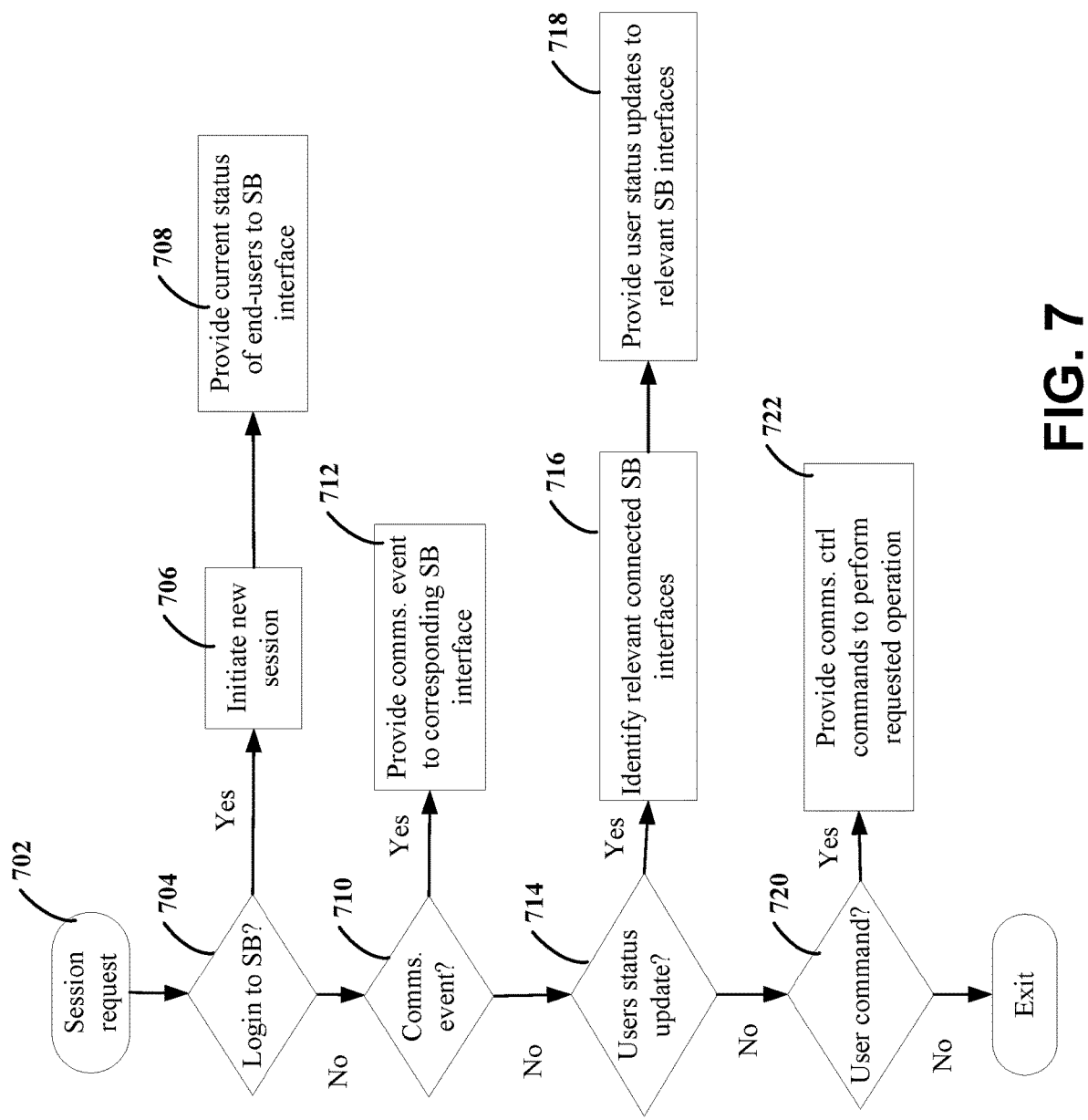
FIG. 7 shows an example process for providing a communication-control subscription between a data communications server and a web-connected switchboard interface, consistent with one or more embodiments.

FIG. 7 shows an example process for providing a communication-control subscription between a data communications server and a web-connected switchboard interface, consistent with one or more embodiments. The process is performed whenever an event 702 occurs. If the event is a receptionist logging into the switchboard at decision block 704, a new communication subscription is initiated with the data communications provider server at block 706 and current status of end-users is provided to the switchboard interface at block 708.

Otherwise, the process proceeds to decision block 710. If the event is the reception of a communication event is received from the data communications provider server, decision block 710 directs the process to provide the communication event to switchboard interfaces for which the communication is pending at block 712. Otherwise, the process proceeds to decision block 714. If the event is the receipt of an end-user status update, decision block 714 directs the process to identify switchboard interfaces having directories including the end-user at block 716. The status update is communicated to the identified switchboard interfaces at block 718. If the event is the receipt of a user command, decision block 720 directs the process to provide a corresponding communication control command (e.g., CTI commands) to the data communications provider server to perform the requested operation at block 722.

Figure 8:
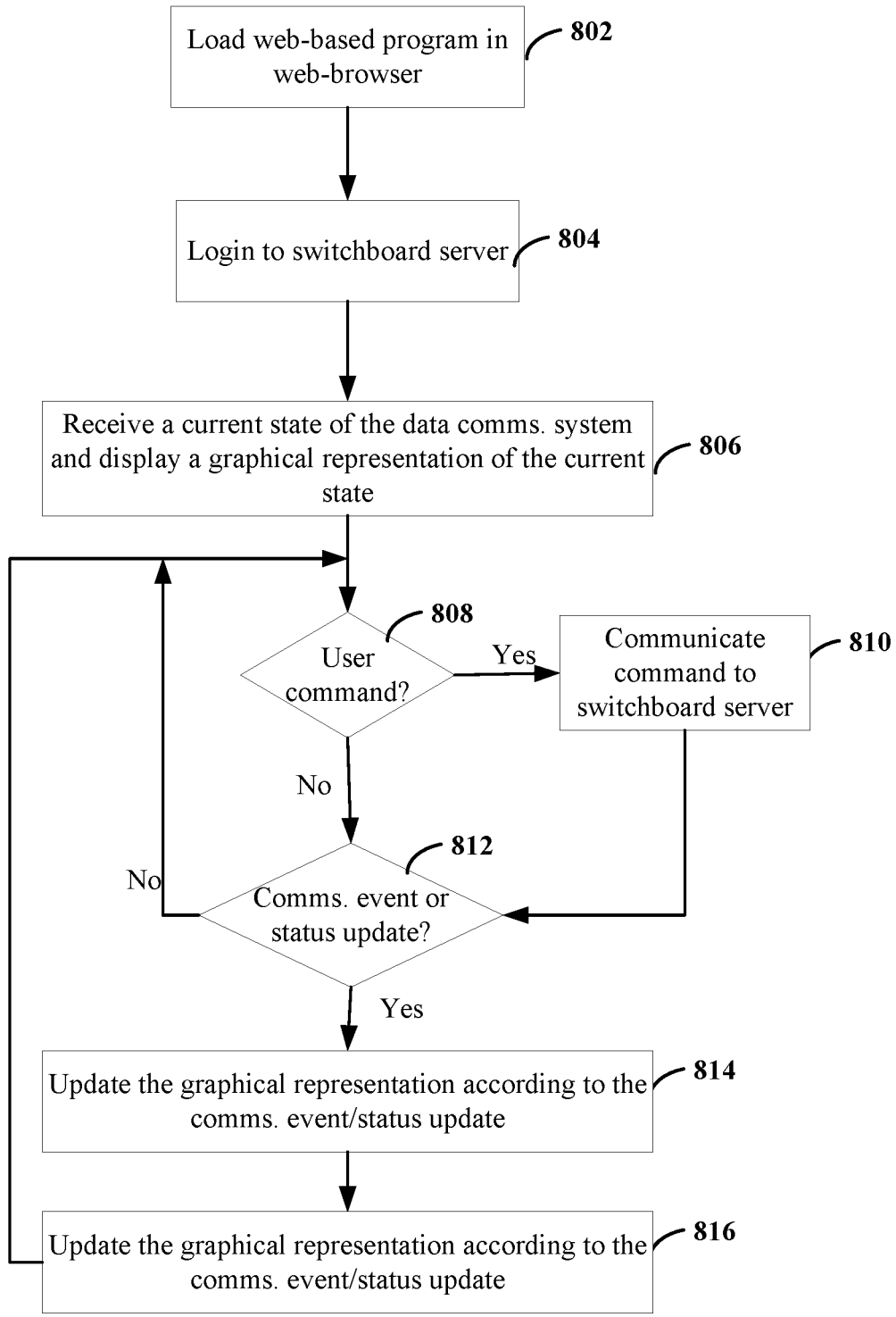
FIG. 8 shows an example process for providing a communication control interface using a web-connected switchboard interface, consistent with one or more embodiments.

FIG. 8 shows an example process for providing communication control interface using a web-connected switchboard interface, consistent with one or more embodiments. A switchboard interface is executed by a web-browser at block 802. A receptionist may cause the web-browser to execute the switchboard interface by directing the web-browser to a web-address of the switchboard server. At block 804, the receptionist logs into the switchboard server via the switchboard interface. As described with reference to FIGS. 6 and 7, when a receptionist logs into the switchboard server, the switchboard server and/or data communications provider server initiate a new communication control subscription and communicate status data (e.g., a current state of users and/or pending communications) indicating the current state of the client entity/endpoint devices associated with the client entity to the switchboard interface. At block 806, the status data is received and a graphical representation of the current state of the client entity/endpoint devices associated with the client entity, including the status of any pending communications for the receptionist, is displayed.

Following block 806, the process then enters a process loop beginning at block 808. If a user command is input to the switchboard interface, decision block 808 directs the process to communicate the user command to the switchboard server at block 810. Otherwise, the process continues to decision block 812. If a status message (e.g., communication event, user status update, and/or device connection update) is received, decision block 812 directs the process to update the graphical representation of the data communications system at block 814 according to the status message. The updated graphical representation is displayed at block 816 and the process returns to the start of the process loop at decision block 808. The process loop continues for the duration of the communication control subscription.

MORE DETAILED AND/OR EXPERIMENTAL EMBODIMENTS

Consistent with the above-characterized embodiments, various other embodiments are based on implementations which involve alternative features and/or involving a type of programming language which is different than disclosed above for use as part of the above embodiments. Accordingly, the present disclosure is not necessarily limited to specific methods, systems, applications and devices in and stemming from the specific embodiments disclosed herein. Other related embodiments and aspects can be fully incorporated in each such disclosed (contemplated/suggested) embodiment. Some of these aspects and embodiments would be recognized from the following discussion.

In certain embodiments, the client-specific control engines provide client-specific control data to the data communications server(s) via an interface protocol platform that characterizes the format in which the client-specific sets of data are communicated to the data communications server. According to various embodiments, data is communicated via the interface protocol platform using high-level programming language instruction set. The high-level programming language instruction set allows a programmer access to the data communications server(s) (or PaaS computing server(s) providing remote services) by way a controlled and limited set of communication control operations and functions. The limitations on the operations can be particularly useful for allowing programming control to be placed into the hands of different customers of the provider of the data communications servers. For example, the provider can update or make other changes to how the data communications servers are configured without requiring modification to documents written to use the high-level language, which might otherwise be required to account for the changes. Moreover, the data communications servers and their data can be protected from poor programming decisions (intentional or otherwise) by tightly controlling the extent that the documents provide control or access the inner workings of the data communications servers.

Consistent with the above discussion, at the client side of the data communications services, the client's computer-based processing (e.g., by the client-specific control engine) generates and submits control (routing/data-communication) directives for assessment and use by the data communications service provider. In a typical implementation, these directives can be realized using codes or one or more commands (or a script of program-created commands). As examples, such codes or command sets can be implemented using a variety of programming control approaches. These approaches include, for example, a programming language (such as C++, XML, JAVA, HTML, SQL, etc.) common to both the client-specific control engine and to the data communications service provider, which receives the directives (submitted from the client side) for adjusting the data communications services being provided to the submitting client. In some implementations, look-up tables with codes/commands as entries can be used by the client engines each time a service change is needed. The entries can be pre-generated by the service provider for use by the client, manually entered by either the client or an installer, and/or generated by logic circuitry (such as implemented in hosted FPGA fabric). For instance, entries may be generated by logic circuitry based on a set of limited assumptions and conditions applicable to that specific type of client and its service expectations/subscription (e.g., no more than 10 extension phone lines in any designated geographic region, only 2 designated extension lines permitted to videoconference, etc.).

By using a common interface protocol (e.g., the programming language, codes or command sets) which is understood by the data communications service provider, authentication and updating for added (telephony) services is readily achieved automatically and remotely without burdening the data communications service provider with cost-intensive set up procedures. Depending on the level of services being added/changed for each client, and/or depending on the client's manual-operator and/or automated technology, the control directives can be generated and submitted in various (coded) ways such as described above and also, for example, by dial tone input generated remotely on behalf of each client, by smartphone app specific to the client, by voice recognition, or combinations thereof. The client engine can also prompt the user to effect and select decisions upon certain client-generated or provider-prompted events. Consistent with the instant disclosure, control directives can be generated by the client (and/or client engines) based on various criteria/parameters According to embodiments of the present disclosure, the data communications servers can be configured to use different high-level programming languages for different functions, where each programming language has a different set of commands. For example, a first high-level programming language can be used to create documents that control communication routing decisions for high volumes of communication traffic, as might occur at the edge of a data communications provider's system. These communication routing decisions can, for example, identify a particular branch office or an IPBX of a particular customer. The identified IPBX might then have additional documents written to communicate using a second high-level programming language that is tailored toward more specific communication processing capabilities that might be associated with a particular account or another identifiable grouping. The distinction between the two programming languages can be particularly useful in terms of improving the scalability of the system. For instance, the language used for communication routing decisions can be relatively light weight, with fewer commands and capabilities. In particular implementations, the first (communication routing) language can contain a subset of the commands available in the second (communication processing) language.

According to various embodiments, the high-level, domain-specific programming language(s) are defined using a markup language as the basis for the language structure. More particular embodiments use extensible markup language (XML). An XML model defines the constraints on the high-level language, including defining the set of valid commands that can be carried out by the data communications servers. Within these constraints, a customer can write XML code that self-describes the building blocks used in the customer's particular application. Another aspect of the communication processing XML is that it allows for various different data structures to be embedded into the XML document or file. For example, a script written in JavaScript can be embedded as character data that the data communications servers are configured to identify and execute. Unless otherwise stated, the use of XML in connection with various embodiments does not necessarily limit the corresponding embodiments, such as limiting the embodiments to the use of only an XML-based language(s).

Particular implementations relate to the use of two separate languages, one that can be used for initial communication routing and the other for providing more complex and specific communication processing functions. In various portions of the present disclosure, the two languages are referred to as either communication processing XML (CPXML) or communication routing XML (CRXML).

The data communications servers providing the underlying function for the PaaS can be configured to utilize a high-level, domain-specific programming language. A particular example language is referred to as Communication Processing extensible Markup Language (CPXML). CPXML refers to a communication processing language which defines the message exchange protocol between a communication control server (e.g., an IntraSwitch with a CPXML Engine) and other sources of information, such as databases, web applications, authentication servers, and servers providing various communication-related services. CPXML can allow developers to program communication processing logic or service execution logic with both XML building blocks and JavaScript/TCL, or other scripting languages. In certain implementations, CPXML allows PaaS customer developers to program and integrate data communication flow (e.g., as provided by a cloud-based data communications service) with customer or third party application servers and databases.

A CPXML engine can send requests to a web server and get XML (CPXML) responses for processing, thereby operating in a stateless manner that is similar to HTML/Internet browser. The CPXML engine can interpret a received CPXML response, and render (execute) CPXML building blocks. Each building block can define functions relating to voice, communication control, and flow control logic. The CPXML engine may also execute other types of code, such as JavaScript, to create dynamic content (e.g., dynamically generated CPXML) for client-side flow control. Each CPXML document may have URL links to a web server for iterative processing, or it may include query requests for retrieving data from various sources. A query could be formatted for consistency with the source of the data (e.g., by using JavaScript Object Notation (JSON) to retrieve data from third party application servers or from the data communications server provider's cloud database). This information can then be used to drive communication flow or communication control decisions.

CRXML defines a limited set of commands to the communication routing logic that allows a customer to define how a communication is initially routed. Maintaining the CRXML as a limited set of simple building block commands can help with the efficiency of the communication control switch. For example, the communication control switch can be located at the perimeter of the data communications provider's routing network, which implies that it may be required to handle a large volume of data communications. The efficiency in processing the large volume of communications can have a significant impact on the performance of the system.

Consistent with various embodiments, the CRXML documents specify a first level of communication routing and simple communication processing that are carried out by the communication control switch. For example, a communication control switch may provide communication routing options for multiple branch offices or locations and for multiple PBXs that support the branch locations. Each branch and PBX may have multiple customer (user) accounts associated therewith. CRXML documents can be used to determine the routing for a communication by identifying a particular branch location, a particular PBX and particular data communications customer account to use in subsequent communication processing and routing. The initial routing decision is indicated by the arrow labelled as "account selection," which shows the passage of control to a communication processing engine.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a communication control circuit). For example, in certain ones of the above-discussed embodiments, one or more modules are discrete logic circuits, computer processing circuits, or programmable logic circuits configured and arranged for implementing these operations/activities, as in the blocks shown in the figures.

Similarly, it will be apparent that a server (e.g., providing a corresponding software platform) includes a computer processing circuit that is configured to provide services to other circuit-based devices. Moreover, a (data communications) endpoint device (or endpoint) includes a communication circuit and (computer) processing circuits which are configured to establish data communications sessions with other endpoint devices (e.g., personal computers, IP-enabled mobile phones, and tablet computers). In certain embodiments, such a processing circuit is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes), the activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. A system comprising:
a server set, including one or more servers, including circuitry with a computer processor, and including a communication routing circuit, the server set being configured according to programming instructions of a first programming language, to provide data-communications services on behalf of a plurality of switchboard interfaces that are respectively associated with a plurality of disparate client entities having respective accounts corresponding to information of different ones of the plurality of disparate client entities stored in a database that is accessed and used by the circuitry for providing certain of the data-communications services;
a switchboard interface from among the plurality of switchboard interfaces to be operated on behalf of a client entity from among the plurality of disparate client entities and via coordination with the server set, to effect routing of data communications involving one or more user-endpoint devices which are associated with the client entity; and
the circuitry to receive a set of client-specific directives conveyed on behalf of the client entity in a set of programming instructions of a second programming language that is characterized in that the second programming language is compatible with the first programming language and maintains security of the circuitry by permitting requests to access, while limiting direct access, to the information in the database.

2. The system of claim 1, wherein each switchboard interface corresponding to a data communications-enabled device of a respective receptionist.

3. The system of claim 1, wherein the server set includes a plurality of cloud-based servers, configured remote from multiple ones of the plurality of disparate client entities.

4. The system of claim 1, wherein the second programming language is further characterized in that the second programming language permits the client entity, through the set of programming instructions, to request analysis of data in a client-specific database.

5. The system of claim 1, wherein the set of client-specific directives is conveyed over at least one wideband communications network on behalf of the client entity.

6. The system of claim 1, wherein the set of client-specific directives includes control directives to adjust certain of the data-communications services provided by the circuitry or the client entity.

7. The system of claim 1, wherein the set of client-specific directives includes top-level control directives that are applicable to data communications for the client entity, irrespective of control directives that are applicable only to one or more designated subsets of user endpoints identified for the client entity, to adjust certain of the data-communications services provided by the circuitry for the client entity.

8. The system of claim 1, wherein the set of client-specific directives includes control directives that are applicable to data communications for the client entity and to less than all of a plurality of designated subsets of user endpoints identified for the client entity.

9. The system of claim 1, wherein the set of client-specific directives includes control directives that are applicable to data communications, for the respective account of the client entity, specific to at least one of particular extensions and end-users.

10. The system of claim 1, wherein the set of client-specific directives includes control directives that are applicable to data communications for the respective account of the client entity, is to cause a data communications to be directed to a particular extension according to certain times, or a certain time, of a given day.

11. The system of claim 1, wherein each of the plurality of switchboard interfaces includes a computer processing circuit and a graphic user interface (GUI).

12. The system of claim 1, wherein the circuitry is configured to act on behalf of a provider of the data-communications services.

13. The system of claim 1, further including at least the plurality of switchboard interfaces.

14. The system of claim 1, wherein the server set includes data analytics servers to monitor and analyze data communications for providing metrics or statistics involving the data-communication services, the metrics or statistics including time-related parameters of data communications provided via the data-communication services.

15. The system of claim 1, wherein each of the switchboard interfaces includes a computer processing circuit, enabled to communicate data, to be operated by a receptionist on behalf of a respective one of the plurality of disparate client entities.

16. The system of claim 1, wherein the data-communications services include a plurality of services from among: a website hosting service, a remote data storage service, a remote computing service, and a virtual contact center service.

17. The system of claim 15, wherein the circuitry is to respond to a change in a status of a subscription-related communication for the client entity, by providing an event message indicating a status of a pending communication to the switchboard interface of the client entity.

18. The system of claim 1, wherein each of the switchboard interfaces includes a computer processing circuit, enabled to communicate data, to be operated by a receptionist on behalf of a respective one of the plurality of disparate client entities, and
is to retrieve communication status information indicating statuses of pending communications.

19. A system comprising:
a server set, including a one or more servers, including circuitry with a computer processor, and including a communication routing circuit, the server set being configured according to programming instructions of a first programming language, to provide data-communications services on behalf of a plurality of switchboard interfaces that are respectively associated with a plurality of disparate client entities having respective accounts corresponding to information of different ones of the plurality of disparate client entities stored in a database that is accessed and used by the circuitry for providing certain of the data-communications services;
a switchboard interface from among the plurality of switchboard interfaces to be operated on behalf of a client entity from among the plurality of disparate client entities and via coordination with the server set, to effect routing of data communications involving one or more user-endpoint devices which are associated with the client entity; and
the circuitry to receive a set of client-specific directives including data that indicates a data metric for the circuitry to monitor or analyze on behalf of the client entity, the set of client-specific directives being conveyed in a set of programming instructions of a second programming language that is characterized in that the second programming language is compatible with the first programming language.

20. For use in a system with a server set, including one or more servers, including circuitry with a computer processor and including a communication routing circuit, the server set being configured according to programming instructions of a first programming language, to provide data-communications services on behalf of a plurality of switchboard interfaces that are respectively associated with a plurality of disparate client entities having respective accounts corresponding to information of different ones of the plurality of disparate client entities stored in a database that is accessed and used by the circuitry for providing certain of the data-communications services, the method comprising:
operating a switchboard interface, from among the plurality of switchboard interfaces, on behalf of a client entity from among the plurality of disparate client entities and effecting communications with the server set to cause routing of data communications involving one or more user-endpoint devices which are associated with the client entity; and
sending on behalf of the client entity and to the circuitry, a set of client-specific directives over a broadband communications network via a set of programming instructions of a second programming language, the second programming language characterized as being compatible with the first programming language and limiting direct access, by the client entity, to the information in the database.

* * * * *